(12) United States Patent
Kruer et al.

(10) Patent No.: US 6,572,039 B1
(45) Date of Patent: Jun. 3, 2003

(54) VARIABLE MULCH HANDLING AND DISPERSING APPARATUS

(76) Inventors: David G. Kruer, 7413 Scottsville Rd., Floyds Knobs, IN (US) 47119; Stephen L. Kruer, 4345 Greenville - Georgetown Rd., Georgetown, IN (US) 47122

( * ) Notice: Subject to any disclaimer, the term of this patent is extended or adjusted under 35 U.S.C. 154(b) by 24 days.

(21) Appl. No.: 09/655,641

(22) Filed: Sep. 5, 2000

Related U.S. Application Data
(60) Provisional application No. 60/152,253, filed on Sep. 3, 1999.

(51) Int. Cl.[7] ............................................. B02C 19/12

(52) U.S. Cl. ................ 241/60; 241/101.76; 241/186.3; 241/605

(58) Field of Search .............................. 241/605, 186.3, 241/101.76, 101.762, 60

(56) References Cited

U.S. PATENT DOCUMENTS

| | | |
|---|---|---|
| 3,979,074 A | 9/1976 | White et al. |
| 4,053,071 A | 10/1977 | Schrag et al. |
| 4,094,427 A | 6/1978 | White et al. |
| 4,151,961 A | 5/1979 | Makofka et al. |
| 4,524,916 A | 6/1985 | Keyes et al. |
| 4,531,880 A | 7/1985 | Paques |
| 4,657,191 A | 4/1987 | Dwyer et al. |
| 4,787,797 A | 11/1988 | Harper |
| 5,181,804 A | 1/1993 | Wysong et al. |
| 5,209,413 A | 5/1993 | Dwyer et al. |
| 5,240,188 A * | 8/1993 | Whitmire ................. 241/101.2 |
| 5,556,041 A | 9/1996 | Cheesman et al. |
| 5,622,323 A | 4/1997 | Krueger et al. |

OTHER PUBLICATIONS

Finn Corporation, Finn B250 Specifications, 1981, Bulletin No. 75–81, Published in USA.
Bowie Industries, Bowie Aero–Mulcher, date unknown, Bowie, Texas.
Finn Corporation, Finn S–500 Large Bale Spreader Specifications, 1983, Bulletin No. 90–83, Published in Knoxville, Tennessee.
Fastline Rocky Mountain Farm & Ranch Edition, Sep. 1999, p. 49, Mighty Tub Grinders, published in USA.
Construction Site News, Sep. 2000, p. 94, No. 460, published in Birmingham, Alabama.

* cited by examiner

Primary Examiner—Mark Rosenbaum
(74) Attorney, Agent, or Firm—Frost Brown Todd LLC; Robert H. Eichenberger

(57) ABSTRACT

A mobile variable mulch handling and dispersing apparatus comprises an input section, a beater section, and a blower section. The input section preferably comprises a primary conveyor further comprising a drag chain conveyor assembly. The input section further comprises a twine removal device that removes twine from bales as they are handled by the apparatus. The beater section preferably comprises at least two counter-rotating shafts disposed substantially horizontally. The first shaft is preferably disposed slightly forwardly of the second shaft. Preferably a third, smaller shaft is disposed forward of both first and second shafts, and rotates in same direction as second shaft. The beater section further comprises funneling surfaces that serve to direct the material into the blower section. The blower section comprises a blower fan assembly that conveys a mixture of air and straw through an exit. In operation users can continually feed bales onto input section, and those bales are conveyed into beater section where they are reduced to their constituent particles. These particles are conveyed at high velocity through blower exit and onto a target area.

38 Claims, 18 Drawing Sheets

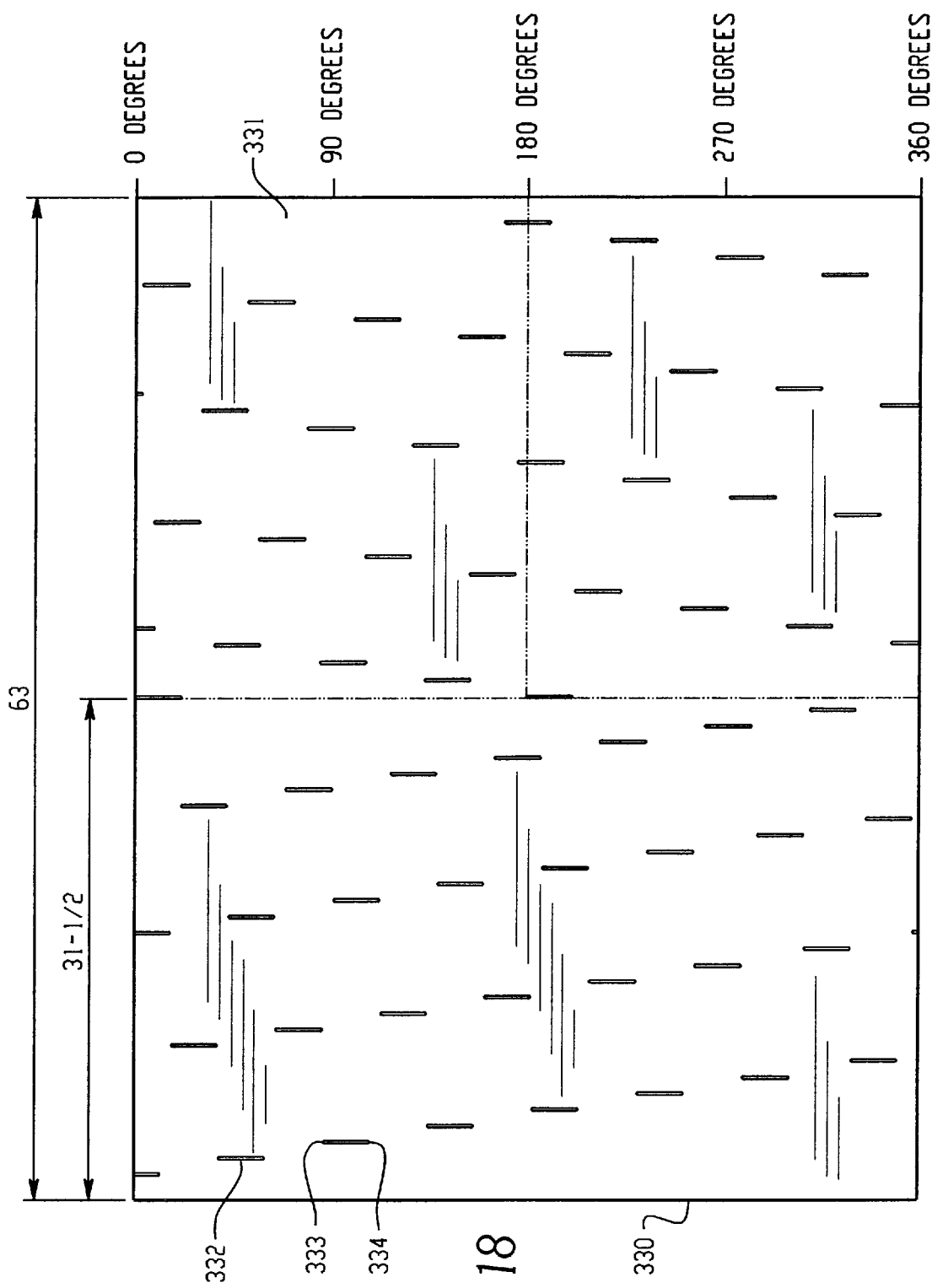

VARIABLE MULCH HANDLING AND DISPERSING APPARATUS

CROSS-REFERENCE TO RELATED APPLICATIONS

This application claims the benefit of U.S. Provisional Application No. 60/152,253, filed Sep. 3, 1999.

STATEMENT REGARDING FEDERALLY SPONSORED RESEARCH OR DEVELOPMENT

Not applicable

BACKGROUND OF THE INVENTION

This invention relates to straw or mulch separating machinery. More specifically, this invention relates to machines capable of receiving bales of hay or straw and picking, tearing, separating, or otherwise breaking up the bales into pieces of straw or hay that can be blown via a blower.

Many industries require and utilize apparatus to reduce bales of hay into small pieces and apply the small pieces of hay in a uniform manner over a large area of ground. For instance, many construction projects entail the extensive movement or removal of soil. As a result, large areas of soil are left without vegetation and exposed to the environment and elements of nature, such as the wind and rain. This absence of vegetation can lead to significant soil erosion. Other industries that must deal with the problems associated with large amounts of exposed soil are the real estate development industry, the road-construction industry, and the farming industry. In all these industries, vast areas of land are exposed to the environment. Likewise, in all these industries, it is desirable to protect the exposed soil from the negative effects of erosion, both from the wind and the rain. In these and many other industries, the area of land to be covered with hay or straw is often quite large. Such a large area requires an apparatus and method that can quickly, safely, and efficiently distribute proper amounts and sizes of hay, straw, etc. particles over the ground. Several prior art apparatus have attempted to fill this need.

To prevent this detrimental erosion, various apparatus and methods have been developed to cover the exposed soil with seed and a mulching material (for instance, hay, straw, mulch, bark, grass, or the like). These mulching materials aid in preventing erosion by impeding the flow of water run-off; providing a protective barrier from the hot sun and the wind; and aiding in seed-germination by retaining moisture in the soil.

Apparatus for breaking up bales of hay are relatively common. However, these devices have been limited not only to the size bales which they can accept, but also to the end uses to which their output can be applied.

As to their size, typical devices have been designed to handle either small cylindrical bales (usually no larger than about 2 feet in diameter and 3 feet in length), or small rectangular "standard square" bales (usually no larger than about 18 inches wide by 24 inches tall by 3 feet long). More recently, larger bale sizes have increased in popularity. Large round bales now exist in sizes on the order of 6 feet in diameter by 6 feet in length, thus weighing over 2000 lb. Likewise, larger square bales exist in sizes on the order of 4 feet in width by 4 feet in height by 8 feet in length.

The use of both shapes of these larger bales has gained greater acceptance in the farming industry for a few reasons. First, the large round bales are popular because they provide a rounded top surface which facilitates rain water run-off, and thus reduces hay spoilage. Second, the larger sizes reduce the number of bales scattered in the fields. Additionally, the large square bales are popular in the western and arid states where the bales must frequently be transported great distances. The larger square bales provide for more efficient loading on the transport vehicles.

As stated, these larger bales have gained acceptance primarily for agricultural applications. As a result, the apparatus and methods that have been designed for handling these bales have generally also been directed to agricultural applications. In particular, the apparatus have been designed generally to loosen ("break up") the bale or divide the bale into several smaller chunks in order to facilitate feeding the livestock. In addition, the apparatus typically provided a means for slowly delivering the loosened bale in clumps at particular locations, either in a substantially continuous "windrow," or in segregated piles spaced around the field.

In addition, several straw blowing machines exist that, in varying capacities, can reduce a bale of hay into fragments that can pass through a blower.

For instance, many devices, usable for standard small-sized "square" bales, use some form of a cylindrical feed drum hydraulically driven from the main drive diesel engine. The drum, which is usually disposed such that its longitudinal axis is substantially horizontal, contains longitudinal flanges, some of which are notched, protruding therefrom. As the drum rotates, these flanges break off "cakes," or clumps, or portions of the bale. These cakes are then fed into a thrashing section of the machine which utilizes thrasher chains and/or cutting teeth attached to the shaft of the blower fan to cut the straw pieces into even smaller pieces.

In addition, giant hay grinders exist which break up large round bales of hay. These devices are huge, cylindrical tubs into which a large round bale of hay is placed for separation. These devices, because of their size and shape, generally have a high center of gravity, and frequently are stationary pieces not suitable for mobile uses.

In addition, some apparatus and methods utilize separate machines, one machine for reducing the large round bales to smaller fragments, and one machine to further separate and blow the fragments. Such machines typically utilize some form of conveyor to carry the fragments from the bale receiving component to the blowing component.

However, these and other prior art machines are not satisfactory to current needs in several respects. First, none of these machines are capable of receiving bales of hay of multiple sizes and shapes. Often, on job sites, bales of certain sizes or shapes are available in a geographical region, and the straw blowing apparatus must be capable of receiving that particular bale in order to function. If such a machine cannot do so, serious delay, frustration, and increased cost can result.

Second, the prior art concept that uses a cylindrical feed drum would lose efficiency when used for the large round bales of hay due to enormous size that would be required. In addition, a large stationary feed drum is not helpful for applications requiring mobility, such as the seeding or covering of large areas of ground.

Third, the prior art machines that typically handle only the rectangular bales of hay, require, generally, at least three persons to fully operate the straw blowing machinery: one person to drive the truck or tractor pulling the machine, one person to feed the bales into the conveyor portion of the machine, and a third person to operate the rotating turret atop the blower. In fact, for maximum efficiency, a fourth person is generally utilized to assist in loading the bales of hay. The requirement of four persons poses significant labor concerns.

Fourth, prior art machines have not contained efficient means of loading the bales. Some machines are self-contained, and are therefore designed to independently pick up a bale that is located in the field, that is, actually sitting on the ground. These machines are not desirable in the industries considered here, where often a large number of bales have been purchased and pre-loaded onto a truck or a trailer for use in mobile applications for covering large areas of soil. Many machines have no convenient and efficient means of transferring the bale from the flat-bed truck or trailer to the bale-reducing apparatus.

Relatedly, many machines that are designed to accept bales from a flat-bed cannot accept large bales or bales of varying shape. Rather, most of these devices are designed only for the small square bales.

Fifth, the majority of the machines in existence have a tendency to clog, jam, or otherwise malfunction when wet material, dense material, or foreign materials are present in the bale.

Sixth, those machines that are used for covering large areas of ground typically employ cutting knives or cutting chains that actually cut the individual pieces of straw into smaller pieces. It has been found that whole individual intact pieces of straw is the ideal covering for exposed soil. If the straw is cut too small or too fine, the coverage rates and the integrity of the covering will suffer. Therefore, further cutting the straw into smaller pieces is not desired.

BRIEF SUMMARY OF THE INVENTION

The present invention is directed toward an apparatus that is capable of receiving bales of hay, straw, mulch, grass, or the like, of numerous shapes and sizes; reducing or breaking up the bales into its constituent particles; and mobilely dispersing or scattering the materials over a large area. As used herein, the term "straw" or "mulch" shall refer to any material that is suitable for providing adequate ground cover and soil erosion control, and specifically includes, but is not limited to the following: hay, straw, grass, mulch, stalks, or other forms of vegetative matter. Also as used herein, the term "bale" shall refer to any substantially solid or compacted form of "straw" or "mulch". The apparatus of the present invention can receive bales of nearly every size and shape currently available. The apparatus of the preferred embodiment is capable of picking, tearing, shredding, breaking, and otherwise separating fragments of straw from the bales. The material thus formed is somewhat uniform and segregated and can be fed into a standard blowing machine for use in spreading the material over the ground to cover the soil and thereby reduce or eliminate erosion. Though not preferred, secondary thrashing chains or other means can be provided, if desired, to further reduce the straw to sizes capable of being blown.

The straw handling apparatus of the present invention comprises three main sections: an input section, a beater section, and a blower section. All sections of the apparatus are mounted on a trailer frame, or chassis, having a low center of gravity. The trailer can be fitted with a hydraulic tongue that can extend to accommodate nearly any type of towing vehicle. In addition, the trailer can be fitted with one or more hydraulic or other type of jacking legs or jack stands that can be extended while the apparatus is non-operational or being stored.

The input section comprises a standard drag chain primary conveyor table for feeding the bales from the input section into the beater section. The primary conveyor's drag chain assembly can be of standard design, and typically comprises drag chains at the ends of the table, fitted with a bar, channel iron, or some other type of transverse linkage fitted therebetween that is capable of engaging the bales of straw and transporting them the length of the conveyor table. The surface of the primary conveyor table at its exit end is received by the floor of the beater section at the input end of the beater section so that the bales of straw easily are fed into the beater section. A floor is disposed beneath the drag chain assembly so as to prevent material from falling through to the ground. This floor is disposed immediately below the transverse linkages so that as the drag chain assembly operates, the transverse linkages can perform a "sweeping" function. Therefore, the table is substantially self-cleaning.

In addition, the input section can, though it need not, comprise a secondary conveyor that can be fitted with an overrunning clutch that allows additional bales to be feeding toward the primary conveyor. Alternatively, or in addition, the input section can comprise a secondary feed table connected (pivotally or hingedly) at one end to the input end of the primary conveyor. This secondary feed table typically has no conveyor, but can have its free end raised and lowered to easily adapt to tow vehicles of any size and shape. Furthermore, the input section can be fitted with a tertiary feed table that can further aid in adapting to any tow vehicle.

The primary conveyor table assembly is fitted with hydraulic cylinders that can change the inclination of the primary conveyor table between approximately 0 degrees to approximately 35 degrees (from horizontal). This allows the primary conveyor to easily adapt to tow vehicles of any size and shape. Angles of inclination greater than 35 degrees are possible (for instance, in an embodiment wherein the primary conveyor table is designed to fold out of the way for storage or transport), but are not preferred.

The primary conveyor table can additionally be fitted with sides and safety mechanisms, such as depressible bars or buttons, that can be activated in order to shut off power to the rotating beater shafts within the beater section and/or the power to the drag chain assembly.

The secondary conveyor table can be pivoted as well, and indeed can be pivoted out of the way in the transport mode. The input section also comprises a winch (hydraulic or otherwise) for transferring the bales from the truck, tractor, trailer, or other tow vehicle to the feed tables.

The beater section comprises a large front portion that receives the bales carried by the drag chain conveyor. The front portion generally is of rectangular or box-like cross section, though other cross sections such as circular, polygonal, or irregular are possible and certainly within the scope of this invention. The front portion of the beater section contains at least two shafts which contain numerous blades or paddles used for picking, tearing, or otherwise separating the straw from the bale. Various configurations for the shafts exist, and various numbers of shafts are possible.

Generally, there are two shafts in the beater section, a first shaft and a second shaft. The first and second shafts are parallel to each other, usually, but not necessarily, in the horizontal plane. When disposed horizontally, however, the first shaft is preferably positioned slightly forward (approximately 2 inches) of the second shaft. The first and second shafts rotate in opposite directions: the first shaft rotates clockwise when viewed from the right side view, while the second shaft rotates counterclockwise when viewed from the right side view. Such opposite rotation between the shafts creates a beating motion that tends to continually feed a bale of straw through the beater section. In other words, such rotation is anomalous to a "pinch point" which is well known in rotating machinery. A gear box is mounted on the side of the beater section and is connected to a shaft from a hydraulic motor that drives the beater shafts. This hydraulic motor, connected to one of the beater shafts (typically the second shaft), provides power for the shafts to rotate. The gear box assembly connects the first and second shafts and provides the counter rotation of the shafts. A shear bolt assembly and coupler can be, if desired, connected to the drive shaft so as to provide a releasable connection between the shafts and the motor. A protective cover generally houses these components to protect not only the components, but also to afford another level of safety for the operators.

In the preferred embodiment, the first shaft comprises a cylindrical shaft having extending therefrom fourteen paddles arranged in such a manner and at such an angle with respect to the longitudinal shaft axis so that the paddles tend to force the material toward the center, as opposed to toward the sides, of the beater section. This helps to channel the straw into the blower section. The paddles have teeth at their outer-most edges. The paddles additionally act as fan blades that serve to increase the amount of air flow in the beater section, which can assist the blower in dispersing the straw. The second shaft of the preferred embodiment comprises a drum having teeth disposed on its outer surface. The preferred embodiment further includes a third shaft, called a metering shaft. The metering shaft is of smaller diameter than the first and second shafts. The metering shaft serves to meter the flow of material into the beater section and to reduce or prevent clogging in the beater section.

The floor of the beater section can contain a semi-cylindrical portion, following the contours of the circumference of the second shaft/paddle or drum/teeth combination. When configured thusly, this semi-cylindrical portion acts as a back-up panel for straw that didn't make it out of the front portion of the beater section and into the blower section. Such items then can fall back into the beaters and again go through this section and eventually be forced into the blower section of the machine. It should be noted that a semi-cylindrical shape is not mandatory.

The beater section further comprises a rear portion having back, sides, top, and bottom surfaces that funnel toward the blower section, these surfaces being termed "funneling surfaces". Various angles of inclination are possible for the funneling surfaces of the sides, top, and bottom of the rear portion of the beater section, with the rate of funneling being altered thereby. The main purpose for the funneling surfaces is to channel the straw into the entrance portion of the blower section.

The blower section of the present invention contains, generally, an entrance portion comprising a standard straw blower fan and shaft situated to receive the material from the rear portion of the beater section. The blower section also typically is fitted with a blower exit, which is a movable or rotatable turret assembly (steering means, ladders, guard rails, seat, and so forth) at its exit end for more accurately directing the straw onto the ground. Located near the operator's seat is one or more control panels having the controls for the various functions of the apparatus. These controls include, but are not limited to, fan blower power; fan blower throttle; power to the first shaft; power to the second shaft; and power to feed table and metering shaft. In addition, the blower exit turret assembly is typically fitted with some form of electronic signaling device, forming part of an electrical signaling system, that can be operated by the person operating the blower turret. This signaling system can be connected electrically to the electrical system of the tow vehicle. Said signaling system allows the turret operator to relay information to the tow vehicle driver that can signify such things as whether and how to regulate the speed and/or direction of the tow vehicle. In addition, said signaling system can include certain safety systems and features to allow the operators to relay emergency or safety information to one another.

As can be seen, an object of this invention is to provide a variable mulch handling and dispersing apparatus that is capable of receiving bales of numerous sizes and shapes.

Another object of this invention is to provide a variable mulch handling and dispersing apparatus that is mobile and capable of being towed on all standard highways.

A further object of this invention is to provide a variable mulch handling and dispersing apparatus that more efficiently breaks apart bales of any standard size or shape.

Yet another object of this invention is to provide a variable mulch handling and dispersing apparatus that is capable of receiving bales from a tow vehicle or other source and handling the bales in an efficient manner.

Another object of this invention is to provide a variable mulch handling and dispersing apparatus that utilizes a beater assembly to provide the breaking or tearing motion.

A further object of this invention is to provide a variable mulch handling and dispersing apparatus that utilizes at least two counter-rotating beater shafts and a metering shaft to effectively handle bales of any size or shape.

Yet another object of this invention is to provide a variable mulch handling and dispersing apparatus that uses at least two shafts mounted to counter-rotating axles.

Another object of this invention is to provide a variable mulch handling and dispersing apparatus that yields good quality ground cover without cutting or reducing the straw into too small pieces.

Still another object of this invention is to provide a variable mulch handling and dispersing apparatus that provides a safe, releasable mechanism that can shut off power to the shafts upon entry of large foreign objects into the beater box section.

Yet another object of this invention is to provide a variable mulch handling and dispersing apparatus that can safely and effectively remove twine from the bales.

A further object of this invention is to provide a variable mulch handling and dispersing apparatus that can be safely and efficiently operated by fewer persons than can many prior art machines, thus reducing labor costs.

Still another object of this invention is to provide a variable mulch handling and dispersing apparatus that has a low center of gravity allowing it to operate safely on rough terrain.

These and other objects of the present invention not explicitly stated will be set forth and will be more clearly understood in conjunction with the descriptions of the preferred embodiments disclosed hereinafter.

BRIEF DESCRIPTION OF THE DRAWINGS

The teachings of the present invention can be readily understood by considering the following detailed description in conjunction with the accompanying drawings, in which:

FIG. 18 is a two dimensional representation of the outer surface of a cylindrical drum fourth shaft according to an embodiment of the present invention, showing multiple teeth;

DETAILED DESCRIPTION OF THE INVENTION

While the present invention will be described more fully hereinafter with reference to the accompanying drawings, in which particular embodiments and methods of fabrication are shown, it is to be understood from the outset that persons skilled in the art may modify the invention herein described while achieving the functions and results of this invention. Accordingly, the descriptions which follow are to be understood as illustrative and exemplary of specific embodiments within the broad scope of the present invention and not as limiting the scope of the invention. In the following descriptions, like numbers refer to similar features or like elements throughout.

Figure 1:
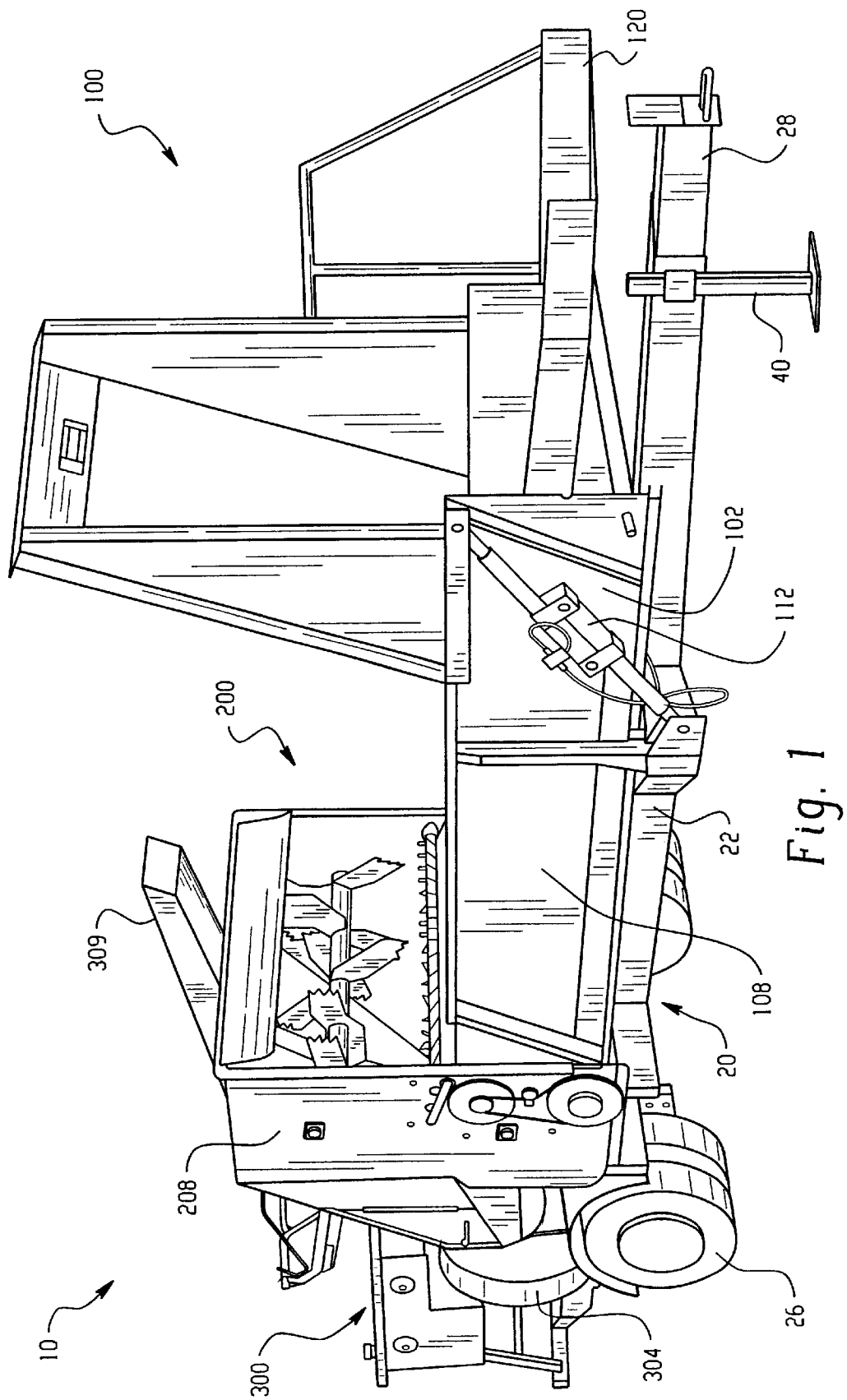
FIG. 1 is a front right perspective view of the variable mulch handling and dispersing apparatus of the present invention.

Referring now to the figures, in particular here FIG. 1, there is shown a variable mulch handling and dispersing apparatus 10. The variable mulch handling and dispersing apparatus 10 comprises, generally, a mobile frame 20, a main drive engine 30, an input section 100, a beater section 200, and a blower section 300.

Mobile frame 20 is of typical design, having, generally, a heavy-duty chassis 22, an axle 24, wheels 26, and a tongue 28. Tongue 28 can be hydraulically operated. Mobile frame 20 can be of any general design and material that is sufficient to support the weight, vibrations, and other loads typical of such heavy-duty machines. Mobile frame 20 is typically fitted with one or more hydraulic or mechanical jacking legs 40 or other types of jack stands 40 to be used when the apparatus is either non-operational or stored. When the apparatus is in use, these jacking legs or jack stands 40 can be retracted or de-activated so that mobile frame 20 can be pulled by a tow vehicle 50 (not shown). Tow vehicle 50 can be any of a number of types, including a tractor, a truck, or any type of agricultural or commercial construction equipment. In the preferred embodiment, the tow vehicle 50 used is a flat bed truck.

In addition, mobile frame 20 can be fitted with a hydraulic, or otherwise-adjustable, tongue 28 to more easily accommodate numerous types of tow vehicles. Hydraulic tongue 28 can extend longitudinally (along the long axis of the mobile frame 20) or transversely or vertically to couple with the tow vehicle 50.

Figure 3:
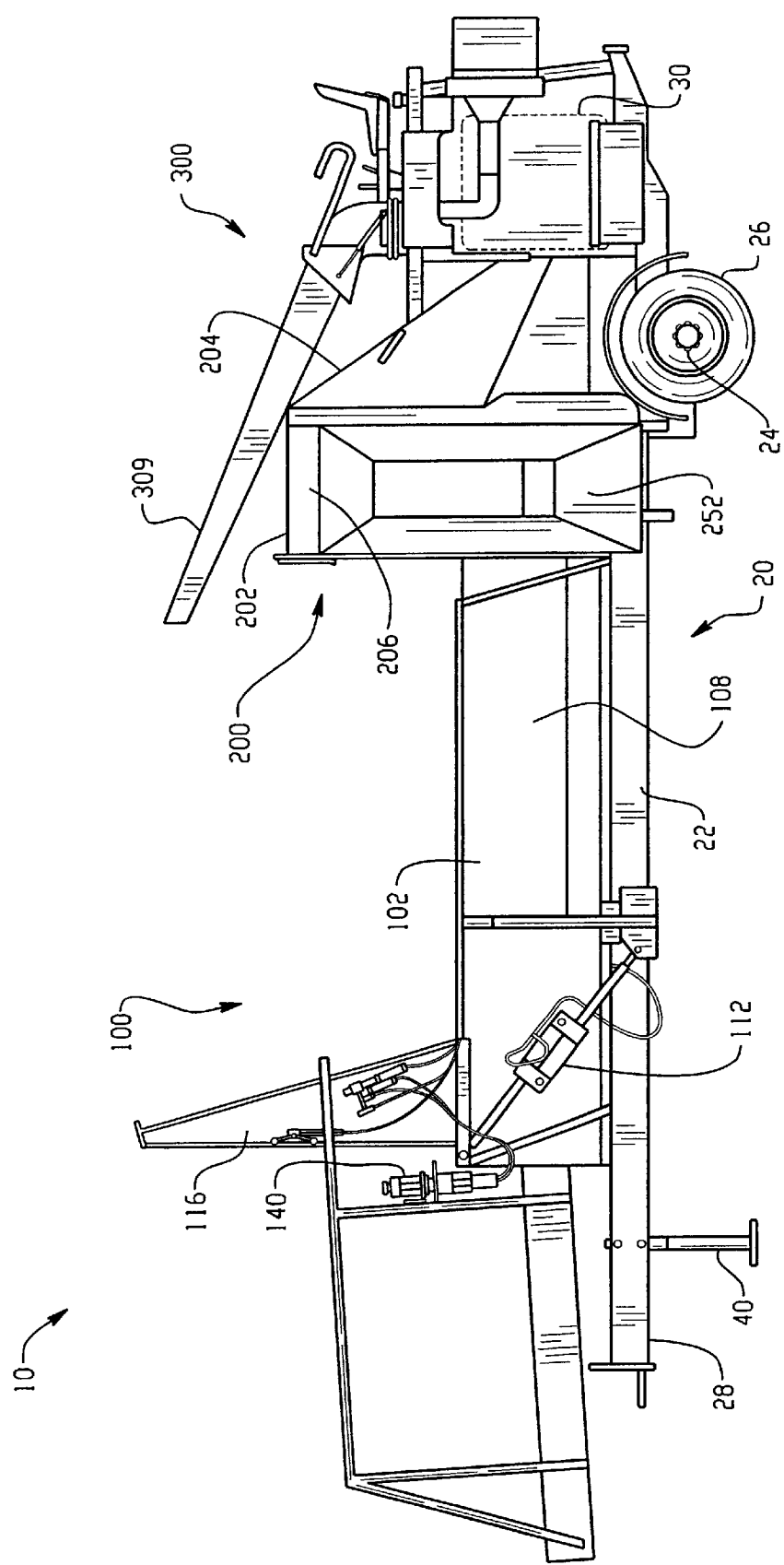
FIG. 3 is a left side elevation view of the variable mulch handling and dispersing apparatus of the present invention.
Figure 4:
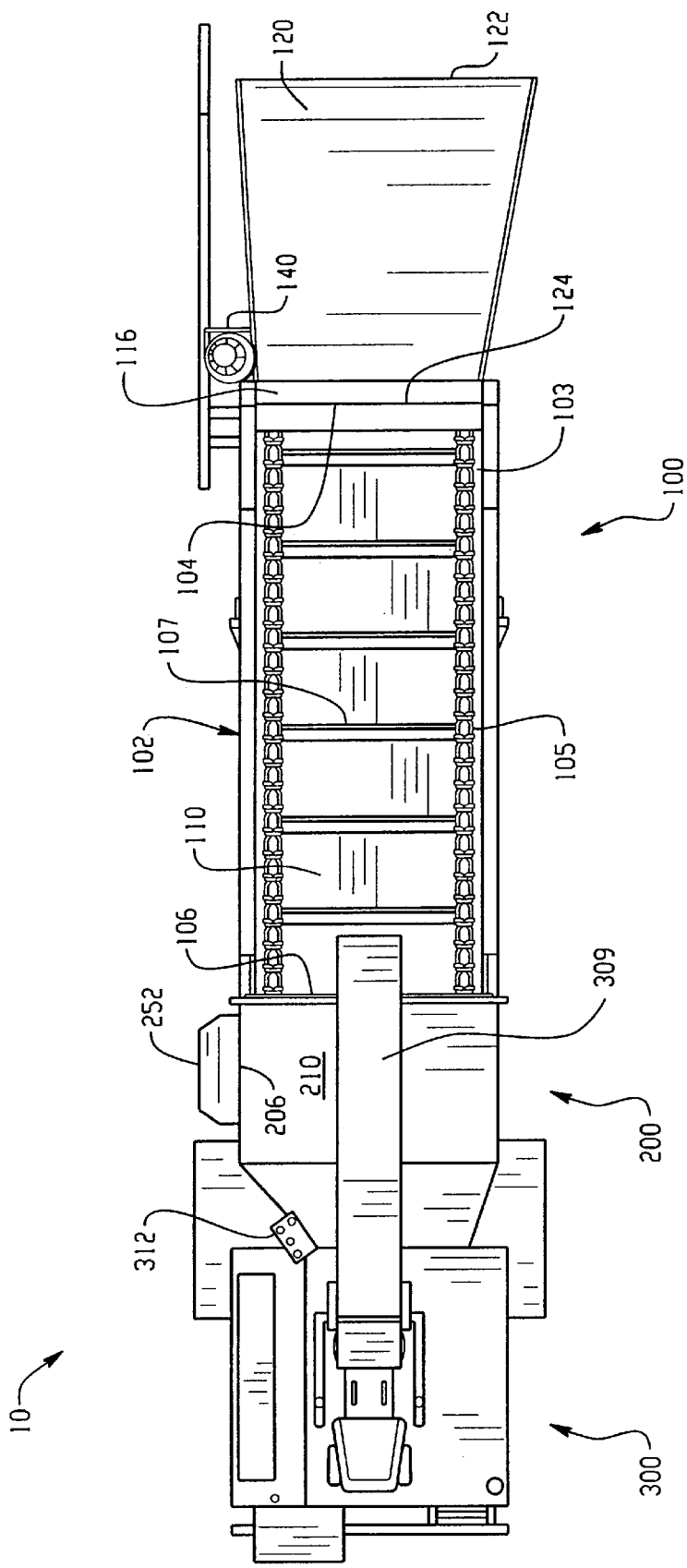
FIG. 4 is a top plan view of the variable mulch handling and dispersing apparatus of the present invention.

Referring now to FIG. 3, the variable mulch handling and dispersing apparatus 10 further comprises a main drive engine 30, shown generally as a dashed outline. Main drive engine 30 is typically a diesel engine, and can be of standard design. Main drive engine 30 of the preferred embodiment is a John Deere TF 150, 170 hp @ 2500 rpm, 6.8 L displacement engine. Main drive engine 30 further comprises a dual hydraulic pump 32 attached thereto. This dual hydraulic pump 32 supplies the necessary hydraulic fluid to all components of the variable mulch handling and dispersing apparatus 10. In particular, one portion of dual hydraulic pump 32 (typically a pump sufficient for an approximately 40 hp motor) provides fluid to a drive motor 34 for beater shafts 220, 230 (described below) and for a metering shaft 240 and primary conveyor 103 (also described below). The second, smaller portion of the pump 32 (typically approximately 20 hp) provides the necessary hydraulic fluid to all remaining components of the variable mulch handling and dispersing apparatus 10, including, but not limited to, the following: a primary conveyor table hydraulic cylinders 112 for altering the inclination of the conveyor tables; the hydraulic jackstands or jacking legs 40; a hydraulic winch 114; the hydraulic tongue 28; and any other hydraulic accessory. The variable mulch handling and dispersing apparatus 10 operates more efficiently when a single pump 32 provides energy to beater shafts 220, 230 and to metering shaft 240 and to primary conveyor 103. This allows the synchronization of beater section 200 with input section 100, and prevents primary conveyor 103 from operating unless beater shafts 220, 230 are operating. Other accessories could drain power to the shafts and thereby reduce the efficiency of the variable mulch handling and dispersing apparatus 10.

The variable mulch handling and dispersing apparatus 10 of the preferred embodiment is mounted, as described, on a mobile frame 20. For maximum versatility, mobile frame 20 is designed for being towed on roadways without requiring an oversize hauling permit. This means that mobile frame 20 must be no wider than eight feet six inches. This also means that no portions of the variable mulch handling and dispersing apparatus 10 extend beyond a similar width during towing.

The variable mulch handling and dispersing apparatus 10 of the preferred embodiment also maintains a very low center of gravity for increased stability on hillsides or sloping or uneven terrain. To achieve both the desired low center of gravity and to not exceed the maximum desired towing width, the variable mulch handling and dispersing apparatus 10 of the preferred embodiment is situated atop mobile frame 20 at an angle of about 3 to 5 degrees, preferably about 4 degrees, with respect to the longitudinal axis of mobile frame 20. This configuration allows maximum space for main drive engine 30, while keeping the weight distribution as far inside the wheels as possible, thus maximizing stability. This also allows input section 100 to be properly aligned with tow vehicle 50. In the preferred embodiment, the clearance between mobile frame 20 and the ground is only approximately 19.5 inches.

Referring now to FIGS. 1, 2, 3, 4, 11, and 12, the variable mulch handling and dispersing apparatus 10 further comprises an input section 100 for receiving bales into the apparatus. Input section 100 typically further comprises a primary conveyor table 102, having an entrance 104, an exit 106, and sides 108; and a secondary feed table 120, having an entrance 122 and an exit 124. Optionally, input section 100 could additionally comprise a tertiary feed table 130 (not shown) which further assists in coupling the variable mulch handling and dispersing apparatus 10 to the tow vehicle 50.

Figure 11:
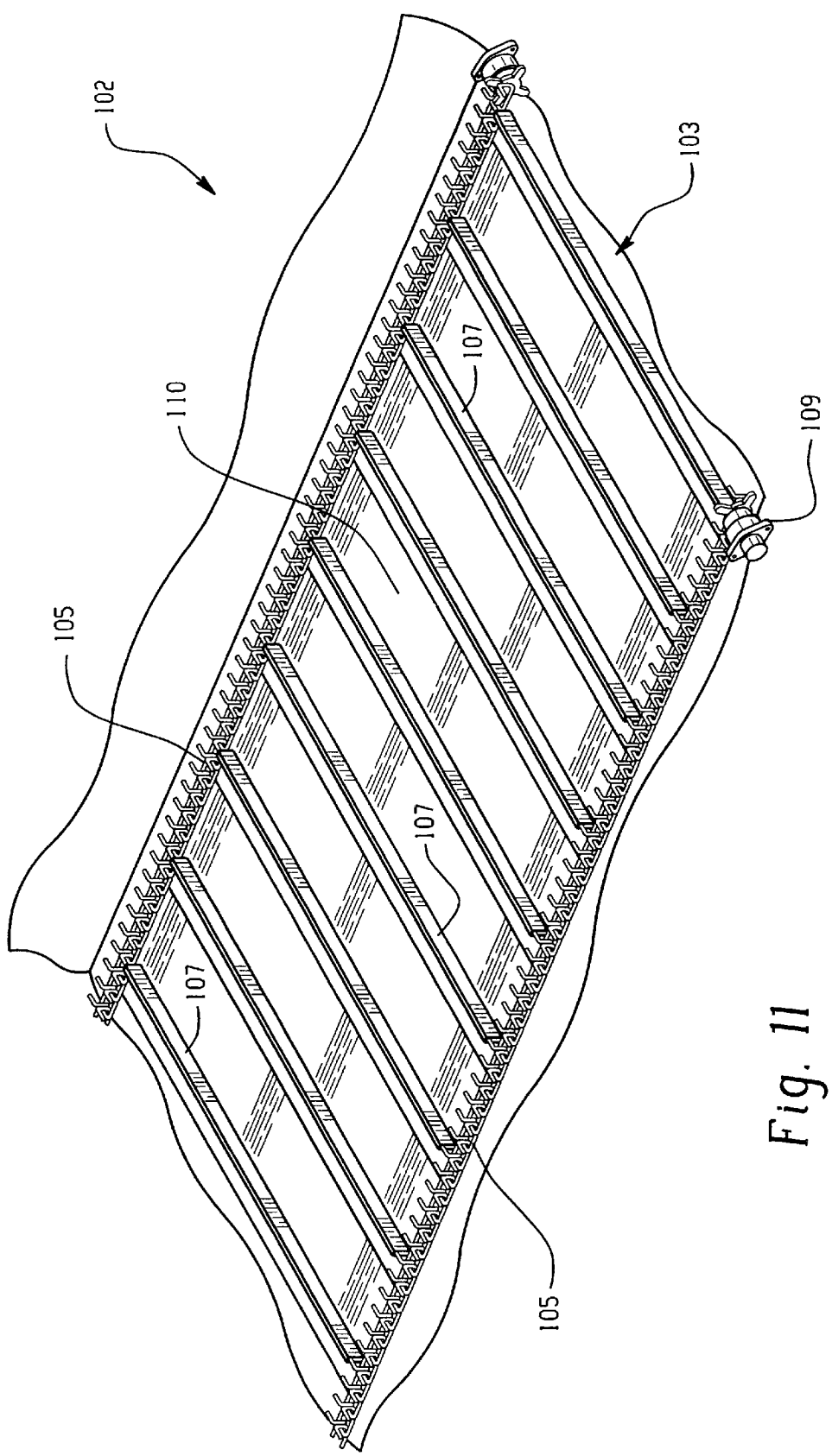
FIG. 11 is partial perspective of the primary conveyor of the variable mulch handling and dispersing apparatus of the present invention.
Figure 12:
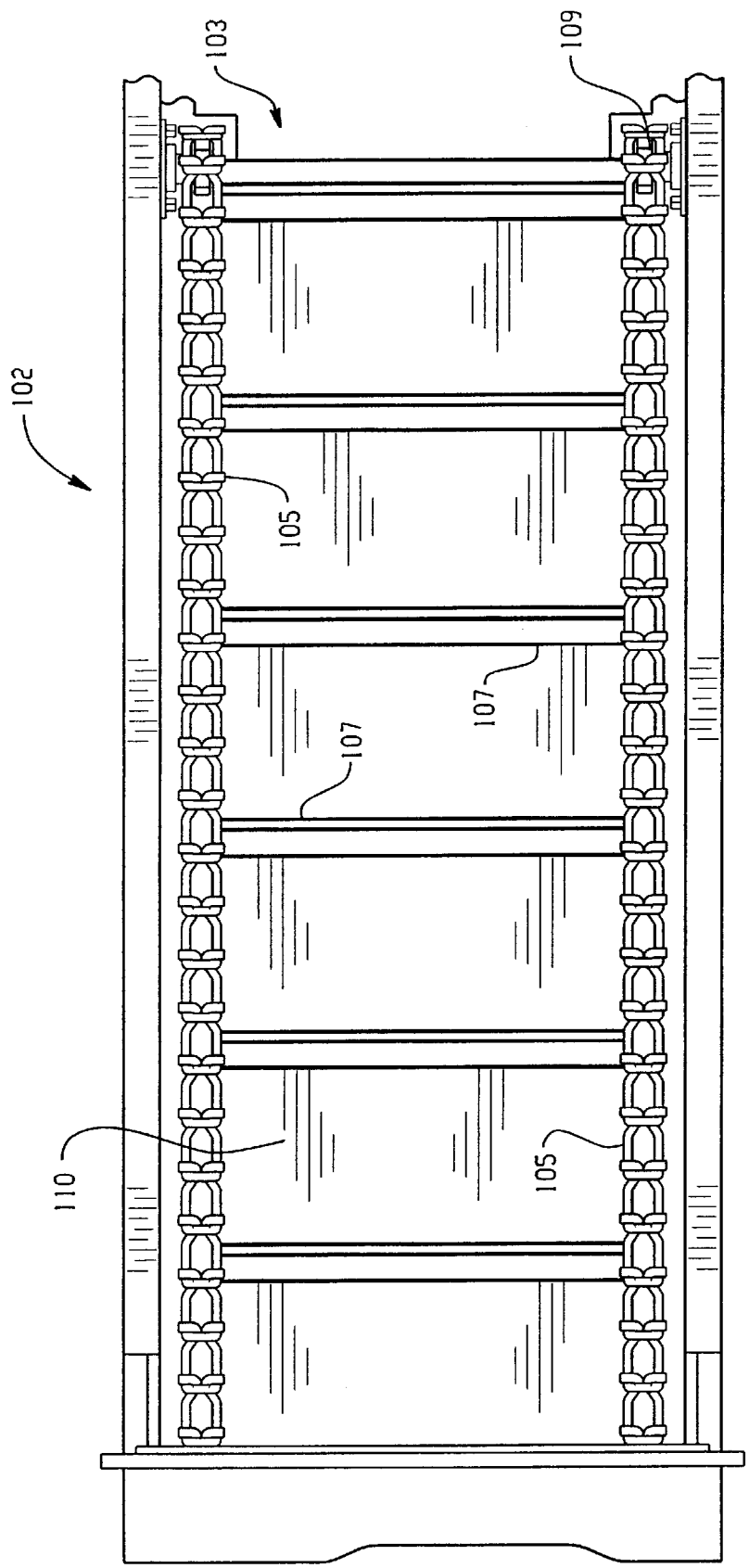
FIG. 12 is a partial top plan view of the primary conveyor of the variable mulch handling and dispersing apparatus of the present invention.

Primary conveyor table 102 further comprises a primary conveyor 103. Primary conveyor 103 can be of many designs suitable for conveying material over short distances, including drag chains, conveyor belts, or any other standard conveying structure. The primary conveyor 103 of the preferred embodiment is a standard drag chain design, comprising drag chains 105 at each side of primary conveyor 103 and transverse linkages 107 fitted therebetween. Transverse linkages 107 can be of varied design, including, but not limited to bars, angles, channels, I-sections, T-sections, or any other design that is capable of engaging the bales and conveying them along the length of the primary conveyor 103. Transverse linkages 107 of the preferred embodiment are standard angles, as best shown in FIGS. 11 and 12.

Primary conveyor 103 further comprises a floor 110 around which the primary conveyor 103 translates. Floor 110 prevents material from falling through primary conveyor 103 to the ground. In the preferred embodiment, floor 110 has its upper surface disposed immediately beneath the lower surface of the transverse linkages 107. This allows the transverse linkages to perform a sweeping or cleaning action as they translate along the length of the floor 110 toward the exit end 106 of the primary conveyor table 102.

Chains 105 are connected to one or more sprockets 109 that in turn are connected to a drive sprocket 111 (not shown), which is driven by motor 34 which receives hydraulic fluid from the main drive engine 30 and hydraulic pump assembly. Drive sprocket 111 can in turn be connected to one or more reducing sprockets or other mechanisms to adjust the speed of revolution of the drive sprocket 111, and therefore the conveying speed of the primary conveyor 103. The speed of the primary conveyor 103 can vary widely, and can be adjusted as needed for proper flow rate of the straw into the beater section 200. The flow crate into the beater section 200 can vary widely, from 0 to approximately 20 feet per minute, depending on the type of mulch being used. For standard, good quality medium density straw, a preferred range of speeds is approximately 0 to 6 feet per minute, with an optimum of approximately 3 to 5 feet per minute. However, the speed will in large part also depend on the particular design of beater section 200, as will be explained in more detail below.

Primary conveyor table 102 is typically fitted with one or more hydraulic cylinders 112 or other mechanisms for adjusting the primary conveyor table 102 to varying angles of inclination in order to more easily receive bales from the tow vehicle 50 or other location. The angles of inclination can be numerous, but typically would be on the order of approximately 0 degrees to approximately 35 degrees, the angle depending in part on the difference in height between the primary conveyor table 102 and the height of the tow vehicle 50 or other bale supply source. Additionally, angles greater than 35 degrees are possible, though not preferred. Such angles would be typical in embodiments wherein primary conveyor table 102, or portions thereof, are folded or inclined out of the way for storage or transport purposes.

Primary conveyor table 102 can additionally be fitted with one or more safety mechanisms, generally described as those that can be activated by an operator to shut off hydraulic power to the rotating shafts in the beater section 200, or to allow an operator to shut off power to the primary conveyor 103.

Figure 6:
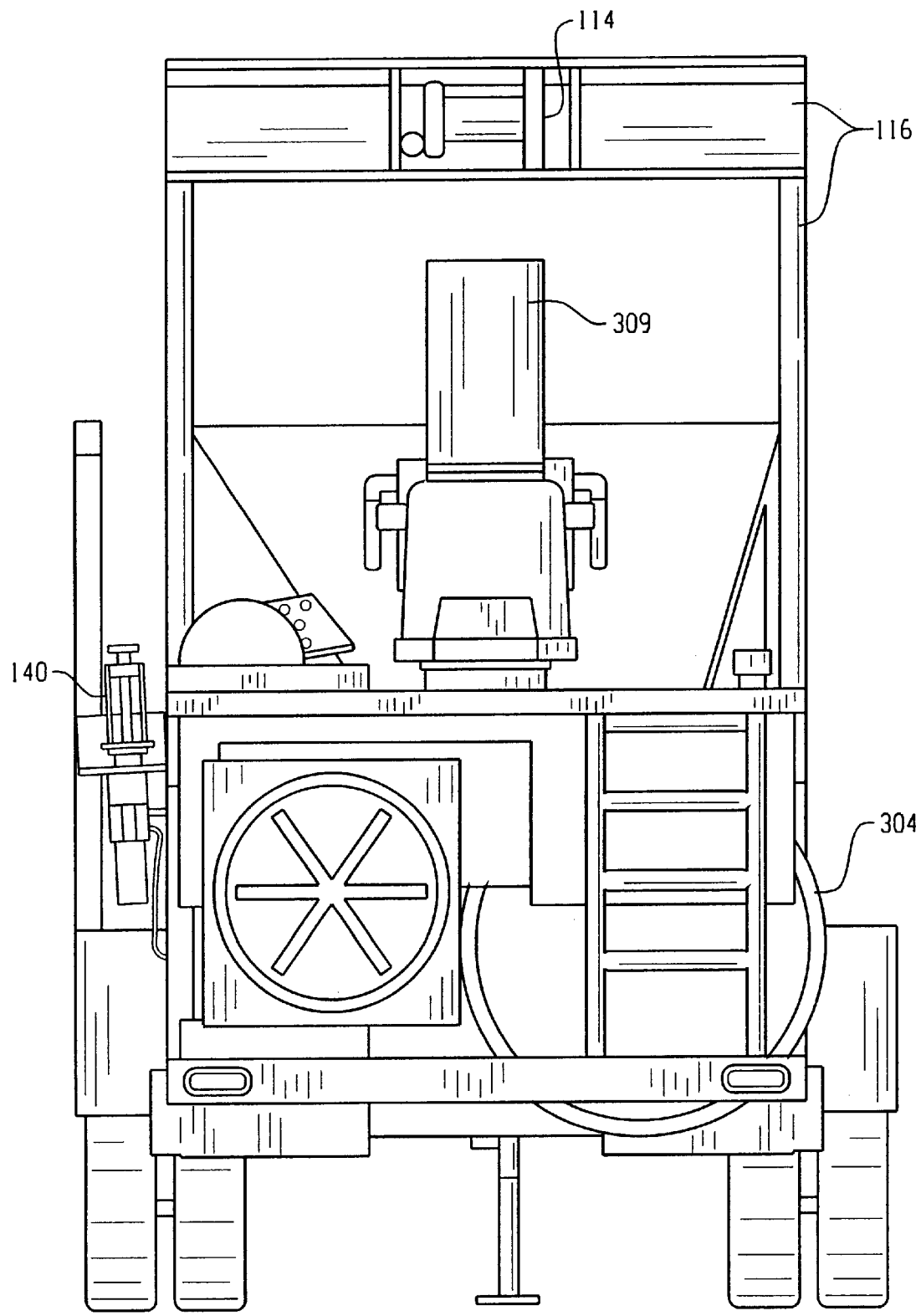
FIG. 6 is a rear elevation view variable mulch handling and dispersing apparatus of the present invention.

Input section 100 can also be fitted with a winch 114 or other type of mechanical device that can assist in transferring the bales from the tow vehicle 50, or other location, to the primary conveyor table 102. Such winch 114 would also include the necessary winch support structure 116, as best seen in FIG. 6. By using winch 114 or similar devices, continuous loading of the apparatus is possible. This eliminates the need, in many prior art devices, of stopping the machine in order to load bales. Continuous loading provides additional versatility for the apparatus. In the preferred embodiment, the winch support structure 116 is mounted on sides 108 of primary conveyor table 102 at a location somewhat rearward of entrance 104. If winch 114 is located forward of entrance 104, winch 114 will not be able to adequately place the bales on primary conveyor 103 so as to be properly engaged by transverse linkages 107.

The variable mulch handling and dispersing apparatus 10 can, but need not, further comprise a secondary feed table 120 having an entrance 122 and an exit 124. Entrance 122 is designed to engage or meet with the flat bed of the tow vehicle 50. Many designs for the secondary feed table 120 are possible. The secondary feed table 120 of the preferred embodiment is a plate-like surface pivotally connected to the primary conveyor table 102 so as to pivot about a horizontal axis. In use, after coupling the variable mulch handling and dispersing apparatus 10 to the tow vehicle 50, the secondary feed table 120 is pivoted from its substantially vertical transport condition to a substantially horizontal operating condition. In this manner, secondary feed table 120 can rest a portion of its entrance 122 on the rear end of the flat bed of the tow vehicle 50.

Alternatively, the secondary feed table 120 could further comprise a secondary conveyor 126 (not shown) utilizing an overrunning clutch assembly. Secondary conveyor 126 is typically, but not necessarily, somewhat shorter in length than is the primary conveyor 103, and is preferably approximately six feet in length. The secondary conveyor 126 can comprise sides, a drag chain or other conveyor means, a winch assembly, safety devices, guardrails, and so forth. The secondary conveyor 126 feed table pivotally affixes to the primary conveyor table 102 so that the table surface of the secondary conveyor 126 is located a distance above the table surface of the primary conveyor table 102. This distance is on the order of approximately 7 to 12 inches. This distance, or drop-off, can assist in loosening the bales and can even start the process of separating cakes separating from the bales. The preferred secondary conveyor 126 utilizes an overrunning clutch assembly that allows a second bale to be conveyed immediately adjacent a first bale that is simultaneously being conveyed by the primary conveyor 103. Upon the bale being translated past the entrance 104 of the primary conveyor table 102, the transverse linkages 107 will automatically engage or "catch" the second bale, and convey it into the beater section 200.

It should be noted that a large round bale can provide enough blown straw to cover approximately 0.75 to 1.0 acre of ground. With two large round bales being automatically fed at a time, this allows operators to cover approximately 1.5 to 2 acres of ground with a single loading of the bales onto the secondary feed table 120. This in turn enables the utilization of only 2 persons to operate the machine. One person, using winch 114 or similar apparatus, can load two large round bales, and then drive the tow vehicle 50 while another person operates the blower section 300. With coverage rates approaching two acres, many jobs can be completed with very few loadings of bales into the conveyors. This is in direct contrast with machines of the prior art that can handle only the small square bales (approximately 14 inches by 18 inches by 37 inches), which have a coverage rate of approximately 30–40 bales per acre. Such prior art machines require at least three persons to operate (a driver, a bale loader, and a blower operator). At least one person is required to continually load bales into those machines because the bales have a very low coverage rate. For efficiency, two persons are often utilized for loading bales into these smaller machines. The design of the present invention thus saves labor costs by reducing the number of persons required to operate the apparatus.

For this same reason, the design of the present invention allows the variable mulch handling and dispersing apparatus 10 to be utilized in hilly or rough terrain where some prior art machines could not operate. This is so because, as stated, a single loading can cover approximately 1.5 to 2 acres of ground. This allows the operators to load the variable mulch handling and dispersing apparatus 10, then take it into the hilly or rough terrain (perhaps with a tractor or other commercial construction equipment in areas where flat bed trucks could not operate) and complete the area without having to reload the variable mulch handling and dispersing apparatus 10. Prior art machines would not be capable of doing this because they require a person to continually load the small bales into the machine, which could prove hazardous in rough terrain.

The variable mulch handling and dispersing apparatus 10 of the preferred embodiment further comprises a twine removal device 140 that removes the twine from the bales. In general, all bales are bound in some fashion with twine so as to help maintain their shape as bales. In prior art machines that have no means for removing the twine, the twine often becomes wrapped around the rotating shafts and/or the separating teeth structures. Inevitably, the apparatus must be shut down to remove the twine. Too much down time in prior art machines results in delay, frustration, and increased costs and problems. And, these problems can be severe and can pose additional safety concerns. In the preferred embodiment, twine removal device 140 is hydraulically operated and easily controlled by the operator loading the bales onto the variable mulch handling and dispersing apparatus 10.

In general, bales are wrapped with twine in certain orientations. This means that removing the twine often can be more efficiently done by pulling the twine from one direction as opposed to pulling it from an orthogonal direction. Because the variable mulch handling and dispersing apparatus 10 can handle bales of any size and shape in any orientation, the twine removal device 140 can be mounted in many orientations and locations on the apparatus. Preferably, the twine removal device 140 is mounted so that it can pivot or move in varying locations so as to most effectively remove the twine from the bale.

The twine removal device 140 of the preferred embodiment (shown in a substantially vertical orientation in the figures) comprises an internal substantially cylindrical body 142, having a proximal end 141 and a distal end 143, disposed about a shaft 144. Shaft 144 can rotate about its longitudinal axis. In the preferred embodiment, body 142 comprises a bottom plate 146 and at least two bars 148, having proximal end 145 and distal end 147, connected thereto, extending from bottom plate 146. Bars 148 are disposed about shaft 144 such that when shaft 144 rotates, points on an outer surface of bars 148 would define a cylinder when viewed along longitudinal axis. Body 142 comprises at its distal end 143 a release mechanism 149 that can increase and decrease the distance between proximal ends 145 and distal ends 147 of bars 148. Furthermore, release mechanism 149 of the preferred embodiment comprises a handle 150 connected to linkages 152 which connect to the distal ends 147 of bars 148. Handle 150 is further connected to shaft 144 in such a manner that allows handle 150 to move along the longitudinal axis from a first position 154 to a second position 156. When handle 150 is in first position 154, linkages 152 force distal ends 147 of bars 148 to their respective first position 158. When distal ends 147 of bars 148 are in first position 158, the distal ends 147 of bars 148 are at a maximum distance from shaft 144. When handle 150 is in second position 156, linkages 152 force distal ends 147 of bars 148 to their respective second position 160. When distal ends 147 of bars 148 are in their respective second position 160, distal ends 147 of bars 148 are at a lesser distance from shaft 144.

Twine removal device 140 further comprises a guide assembly 162 through which, on which, or by which the twine passes. Guide assembly 162 can be of many designs, including, but not limited to, eyelets, rings, split rings, partial circular sections, or any opposing smooth surfaces across which twine can travel without being cut or abraded. The purpose of the guide assembly 162 is to provide a consistent path of travel for the twine as the twine enters the twine removal device 140, despite the fact that beyond the guide assembly 162, the twine may come from many different directions depending on where the bale is relative to the twine removal device 140. In this way, the guide assembly 162 is similar to any bobbin device or similar device wherein it is desirable to keep the distance and tension of the twine substantially constant or uniform during winding.

During operation, upon loading a bale onto the secondary feed table 120, the operator removes one end of twine from the bale. The operator places handle 150 into its first position 154. Then the operator places the twine through the guide assembly 162 and wraps the twine around the bars 148 sufficiently to prevent twine from coming unwrapped from bars 148. Then, the operator activates the twine removal device 140 by, in the preferred embodiment, supplying it with hydraulic power. The operator can control, via hydraulic controls, the speed of rotation of the shaft 144, and therefore the speed of revolution of bars 148—and therefore the speed at which the twine is wrapped around bars 148. When all the twine has been removed from the bale, the operator can shut off power to the twine removal device 140. Then, to remove the twine from the twine removal device 140, the operator simply places handle 150 in its second position 156. Through linkages 152, this places distal ends 147 of bars 148 in their second position 160. Since in their second position 160 the distal ends 147 of bars 148 are at a lesser distance from shaft 144, the twine is easily removed by sliding it longitudinally toward the distal ends 147 of bars 148.

Referring again to FIGS. 1, 2, 3, and 4, the variable mulch handling and dispersing apparatus 10 further comprises a beater section 200 having a front portion 202 and a rear portion 204. The front portion 202 generally comprises a left side 206, a right side 208, a top side 210, an entrance 212, and an exit 214. Front portion 202 is generally of box-like cross section, when viewed from the front, but many cross sections are possible and within the scope of this invention, including, but not limited to circular, polygonal, and irregular.

Additionally, front portion 202 is large enough to receive large bales of hay of any size and shape. The cross-sectional dimensions of the entrance chamber could feasibly be in the range of, on the order of, approximately one foot in length and width, all the way to approximately eight feet in length and width, and in some cases even larger. Too large of a cross-section, however, would prevent the apparatus from being towed on federal and state highways absent an oversize permit, which is required for vehicles over 8 feet 6 inches in width. In addition, the smaller dimensions hinder one of the objects of this invention, that is, to receive bales of any and all sizes and shapes. As a result, the cross-sectional dimensions of embodiments of this invention tend to be larger, that is, on the order of four to six feet in length and width. In the preferred embodiment, the entrance 212 cross-sectional dimensions are approximately 65 inches wide by 71 inches tall by 36 inches in depth. This size allows the variable mulch handling and dispersing apparatus 10 to receive nearly all of the standard shapes and sizes of bales currently in common use, while still being capable of being towed without an oversize permit. It should be recalled that the working portions of the variable mulch handling and dispersing apparatus 10 of the preferred embodiment are situated on the mobile frame 20 at an angle of approximately 3 to 5 degrees, preferably about 4 degrees, left of the longitudinal axis of the mobile frame 20. This is to accommodate the large main drive engine 30 situated at the rear of the mobile frame 20, while still allowing the width of mobile frame 20 to be within roadway width limits.

Entrance 212 of beater section 200 receives bales delivered by primary conveyor 103 of input section 100. Front portion 202, whose entrance coincides with entrance 212 of beater section 200, is where the bales are primarily separated into smaller pieces. Front portion 202 also comprises an exit 203. Front portion 202 generally contains at least two rotating shafts, a first shaft 220 and a second shaft 230. It should be noted that shafts 220, 230 can be disposed in many arrangements (vertically side-by-side, horizontally upper-and-lower, and many other arrangements) and still come within the scope of this invention. Generally, both the first shaft 220 and the second shaft 230 further comprise blades, paddles, teeth, bars, nubs, fingers, flanges, protrusions, or the like disposed thereon to assist in separating the bale, to be described immediately below. Additionally, a third shaft 240, referred to as a metering shaft, is useful for improving efficiency and for preventing clogs, as will be described below.

Figure 5:
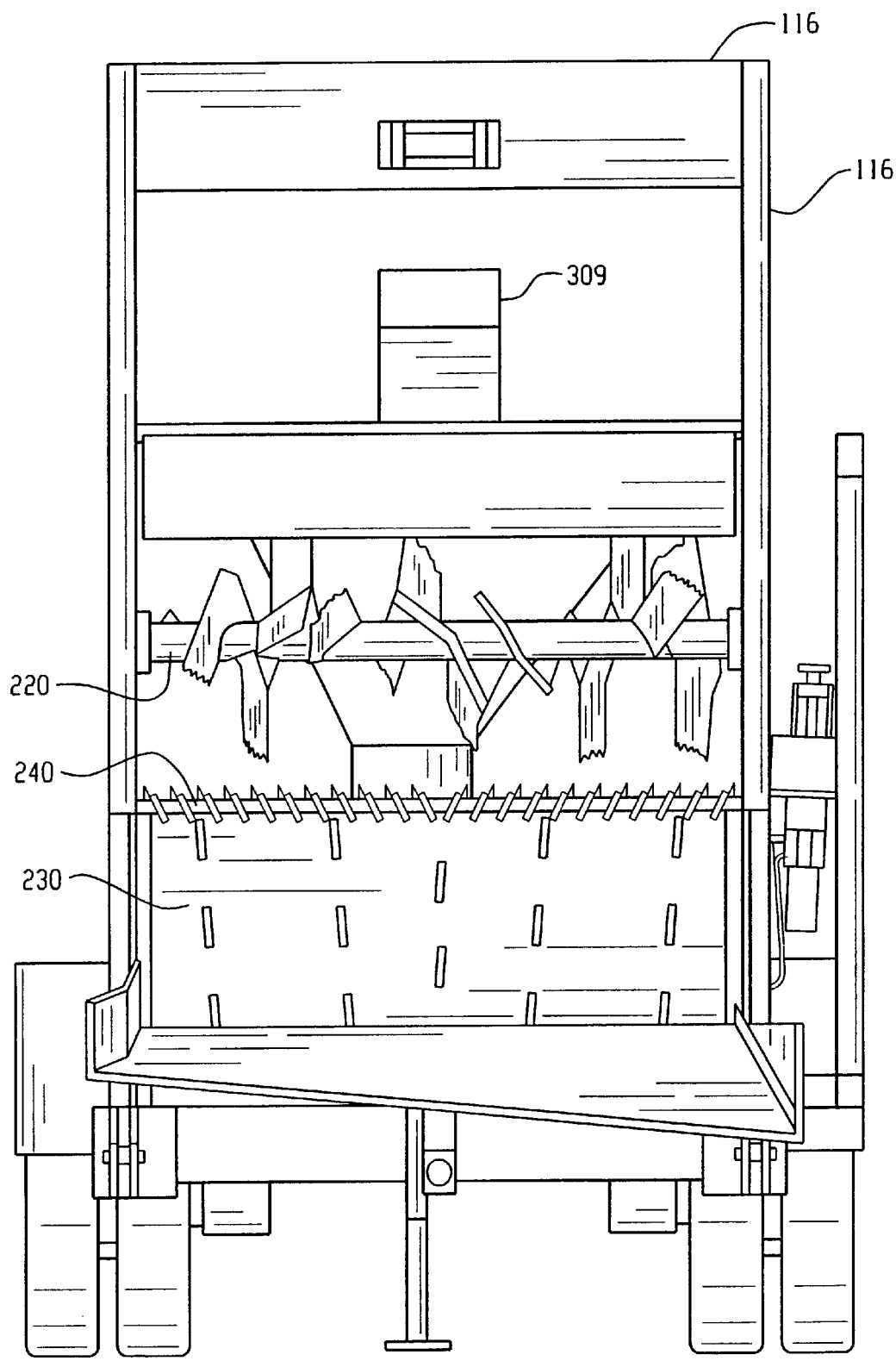
FIG. 5 is a front elevation view of the variable mulch handling and dispersing apparatus of the present invention.
Figure 7:
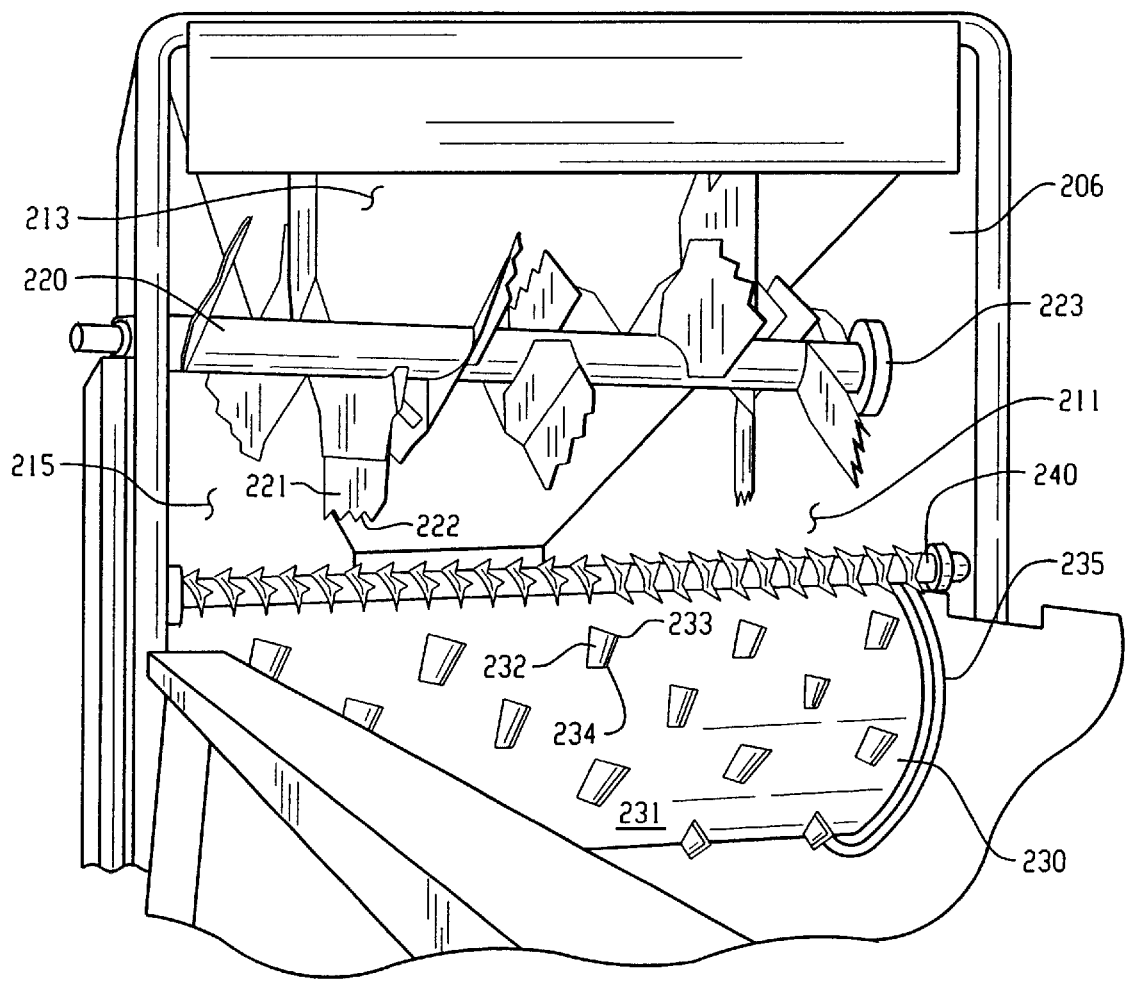
FIG. 7 is a partial right front perspective view of the beater section of the variable mulch handling and dispersing apparatus of the present invention.
Figure 8:
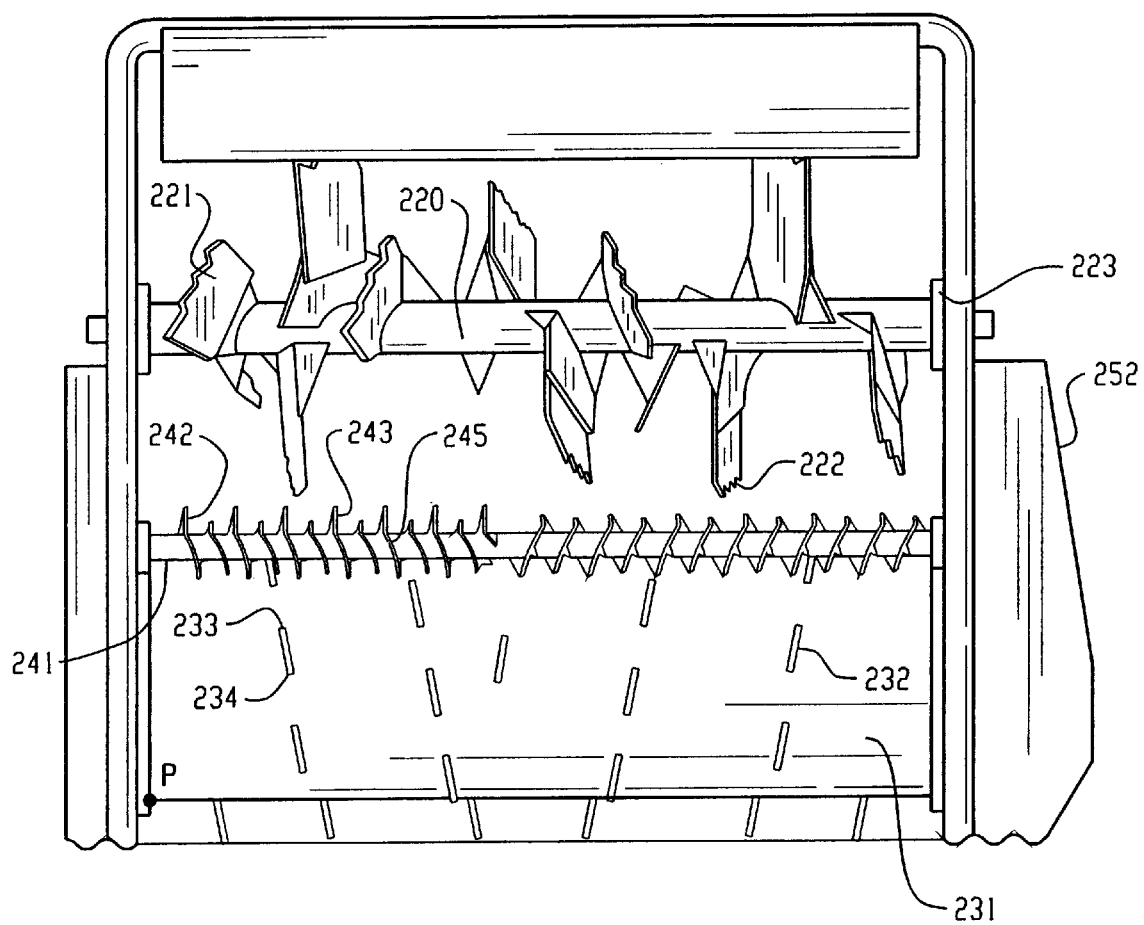
FIG. 8 is a partial front elevation view of the beater section of the variable mulch handling and dispersing apparatus of the present invention.
Figure 10:
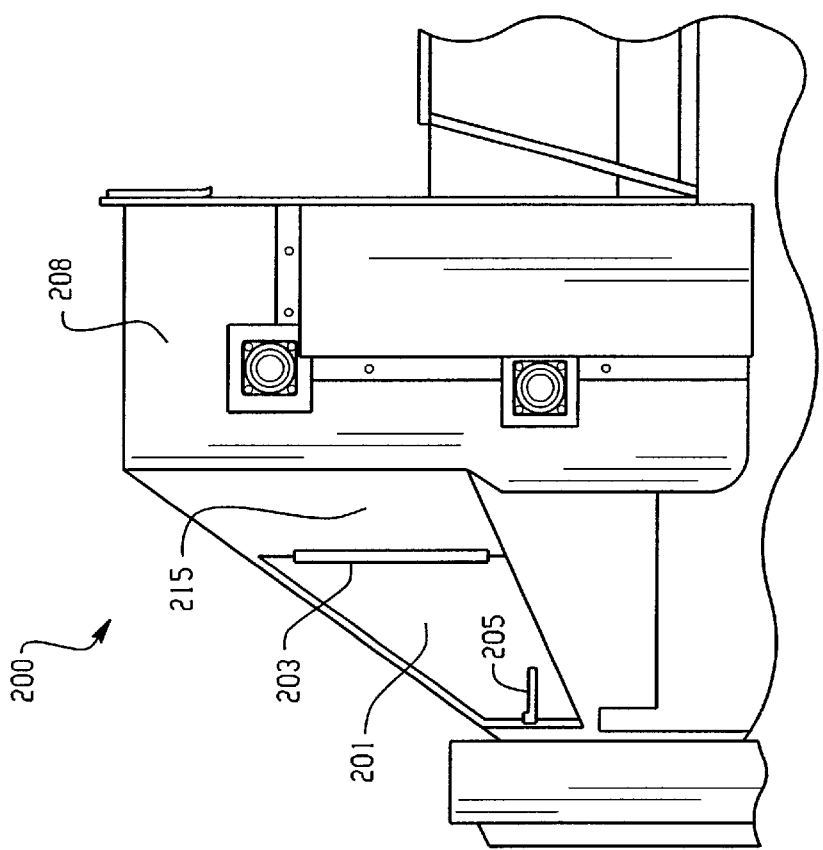
FIG. 10 is a partial right side elevation view of the beater section of the variable mulch handling and dispersing apparatus of the present invention.

Referring in particular to FIGS. 5, 7, and 8, first shaft 220 and second shaft 230 are disposed in front portion 202. First shaft 220 is generally parallel to second shaft 230, both shafts being substantially horizontally disposed in the preferred embodiment. In the preferred embodiment, the first shaft 220 is disposed slightly closer to the entrance 212 than is the second shaft 230. Most preferably, the axis of first shaft 220 is disposed approximately two inches closer to the entrance 212 than is the axis of second shaft 230. The purpose for this is to more efficiently pick off or grab the straw. If first shaft 220 is too far forward of second shaft 230, the straw could impact rear funneling surfaces 211, 213, 215 (described below) too far forward, and thus fall short of the entrance to blower section 300 (described below). If first shaft 220 is not situated far enough forward of the second shaft 230, straw could be picked from the top half and bottom half of the bales simultaneously and perhaps clog the variable mulch handling and dispersing apparatus 10. This could especially be true if the bales are wet.

First shaft 220 and second shaft 230 each have blades, paddles, teeth, bars, nubs, fingers, flanges, protrusions, or the like disposed thereon or affixed thereto. Said protrusions are spaced along the length of first shaft 220 and second shaft 230 and are typically arranged in such a way that when the shafts rotate, the straw material tends to be deflected from the protrusions toward exit 203 of front portion 202 and into rear portion 204. This is typically achieved by having, on each shaft, one half of the protrusions disposed at an angle slanting toward the right (i.e., toward one end of the shaft), and the other half of the protrusions disposed at an angle slanting toward the left (i.e., toward the opposite end of the shaft). In addition, the protrusions are typically arranged so that a string connecting the outermost edges of each protrusion, beginning at one end of the shaft and continuing toward the center of the shaft, would define a generalized spiral shape.

Referring now in particular to FIGS. 7 and 8, two of the many possible types of shafts 220, 230 are shown. Indeed, the variable mulch handling and dispersing apparatus 10 can operate with many configurations for first shaft 220 and second shaft 230, as described above. However, the preferred embodiment comprises, generally, the shafts depicted in FIGS. 7 and 8. In particular, first shaft 220 comprises a shaft having fourteen paddles 221. Seven of the paddles 221 on first shaft 220 are disposed at an angle of approximately 23 degrees to the left (that is, toward left side 206), while seven of the paddles 221 are disposed at an angle of approximately 23 degrees to the right (that is, toward right side 208). In the preferred embodiment, first shaft 220 has an approximate diameter of 4.5 inches, to which are attached paddles 221. Paddles 221 are approximately 12.5 inches in length, measured radially outward from the shaft, and approximately 8.5 inches in width. This arrangement yields a first shaft 220 having an outer diameter of approximately 30 inches with the paddles 221 attached. Likewise in the preferred embodiment, the paddles contain four serrated teeth 222 approximately one inch in depth. Each of the teeth in the preferred embodiment contain a vertical front face, a diagonal back face, and a flat outer face. It is to be noted, however, that the serrated teeth could terminate to form a point instead of a flat outer face, but a flat outer face is preferred because it is less likely to skewer the straw, thereby aggregating straw on the paddles 221, which can lead to clogging. It should be noted that a good arrangement for the first shaft 220 is achieved by using a shaft similar to a standard John Deere Model 570 manure spreader. In the preferred embodiment, first shaft 220 rotates clockwise when viewed from the right side, as in FIG. 2. Speeds of rotation vary widely, from about 50 rpm to about 800 rpm, with the preferred speed being approximately 550–600 rpm. It should be noted that the speed needs to be at least fast enough to pitch the straw over the shaft toward blower section 300. In addition, with first shaft being a paddle design, first shaft acts as a fan, increasing the air that enters blower section 300. In effect, by using a paddle arrangement for first shaft 220 (or indeed for second shaft 230), the paddles generate sufficient air flow within the apparatus as to supercharge blower fan 304. This can increase the efficiency and the capacity of blower section 300. It is noted that alternative embodiments for first shaft 220 are possible which vary the size and shape of paddles 221, thus varying the extent to which the supercharging effect is present. It is further noted that an alternative embodiment is possible wherein blower section 300 is not present, and wherein a fan or auxiliary blowing apparatus is connected to the variable mulch handling and dispersing apparatus 10 to assist in removing straw from beater section 200.

It should be noted here that the serrated teeth 222 facilitate picking or tearing of the straw from the bale, as opposed to actually cutting of the straw. Indeed, cutting is not desired because one of the objects is to maximize the size of the individual pieces of straw that exit the apparatus. Larger pieces of straw make better ground cover, and therefore higher quality service. In this regard, this invention is distinguishable from those in the prior art that have cutting blades, cutting teeth, or similar cutting devices affixed thereto. The protrusions of the current invention serve merely to pick or separate the straw from the bale. It should further be noted that in the preferred embodiment, the "bite profile" of teeth 222 of first shaft 220 is substantially continuous. This means that if one were to make an impression on a board of teeth 222 as they revolve around the axis of first shaft 220, the board would indicate that teeth 222 would impact the board substantially the entire length of the board. In other words, teeth 222 are fixedly attached so as to create overlap during revolution.

To prevent twine or extremely long pieces of straw or debris from wrapping around the rotating first shaft 220, a collar 223 is placed at terminal ends of the first shaft 220. The collar 223 allows the first shaft 220 to freely rotate within the collar 223, while preventing twine and other debris from getting wrapped around the shaft.

Figure 15A:
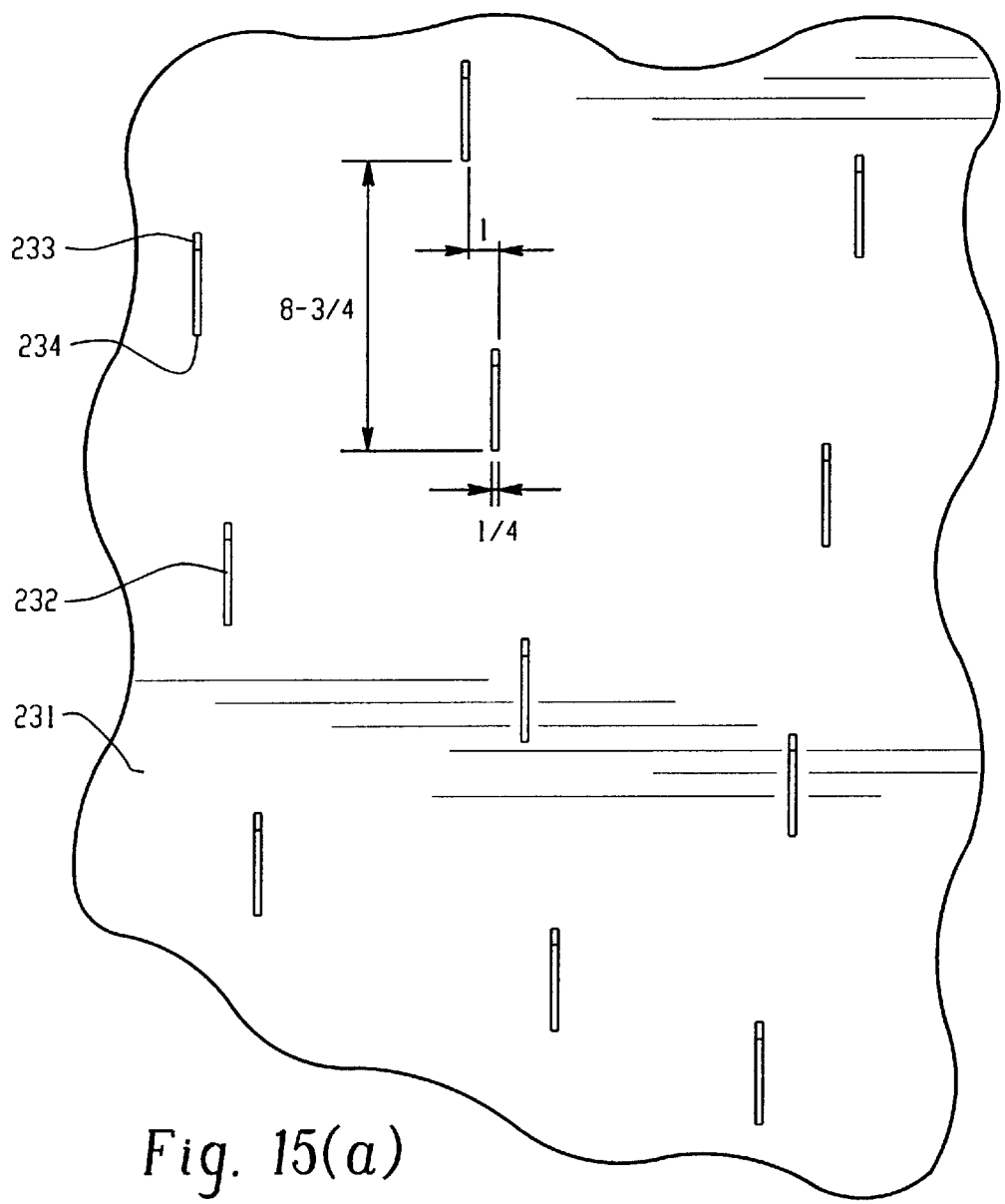
FIG. 15a is a close-up depiction of several teeth of the second shaft, indicating a typical bite profile according to an embodiment.
Figure 15B:
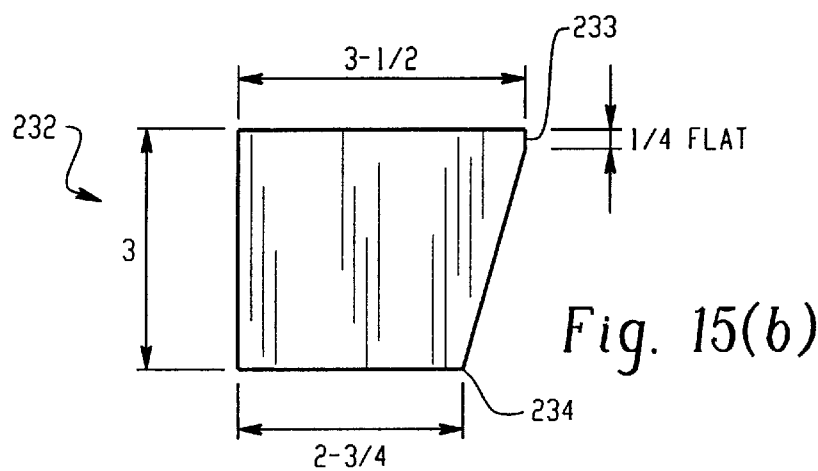
FIG. 15b is a side elevation view of a tooth, according to one embodiment.

Referring still to FIGS. 7 and 8, second shaft 230 preferably comprises a drum 231 on which are attached multiple teeth 232. Teeth 232 are disposed on the surface of the drum 231 at an angle to the longitudinal axis of drum 231. Teeth 232 can have many varied shapes, including but not limited to any polygonal shape or any irregular shape (see FIG. 15*b*). In the preferred embodiment, teeth 232 have a trapezoidal shape when viewed from the side. Configured thusly, teeth 232 have a leading edge 233 and a trailing edge 234. For ease of discussion, assume that FIG. 8 shows a longitudinal cross-section of the drum 231. If one considers a two-dimensional rectangular coordinate system with its origin at the lower left corner of the cross-section of drum 231, depicted by the letter "P" in FIG. 8, then those teeth closest to P will have a negative slope, while those teeth farther away from P will have a positive slope. In this manner, the material which is picked from the bale is directed toward the center of the rear portion 204. Similar to that of the first shaft 220, a string connecting each of the teeth 232 on the second shaft, beginning at one end of shaft 220 and continuing toward the center of shaft 220, would form a generalized spiral shape. The point along the longitudinal axis of drum 231 at which the slopes of the teeth 232 change from negative to positive will depend upon the location of the input to the blower section 300 (to be described below). Ideally, the location of the change in slope will coincide with the input of blower section 300 so that the material picked from the bale will be directed toward blower section 300. This tends to increase the efficiency of the apparatus.

Figure 2:
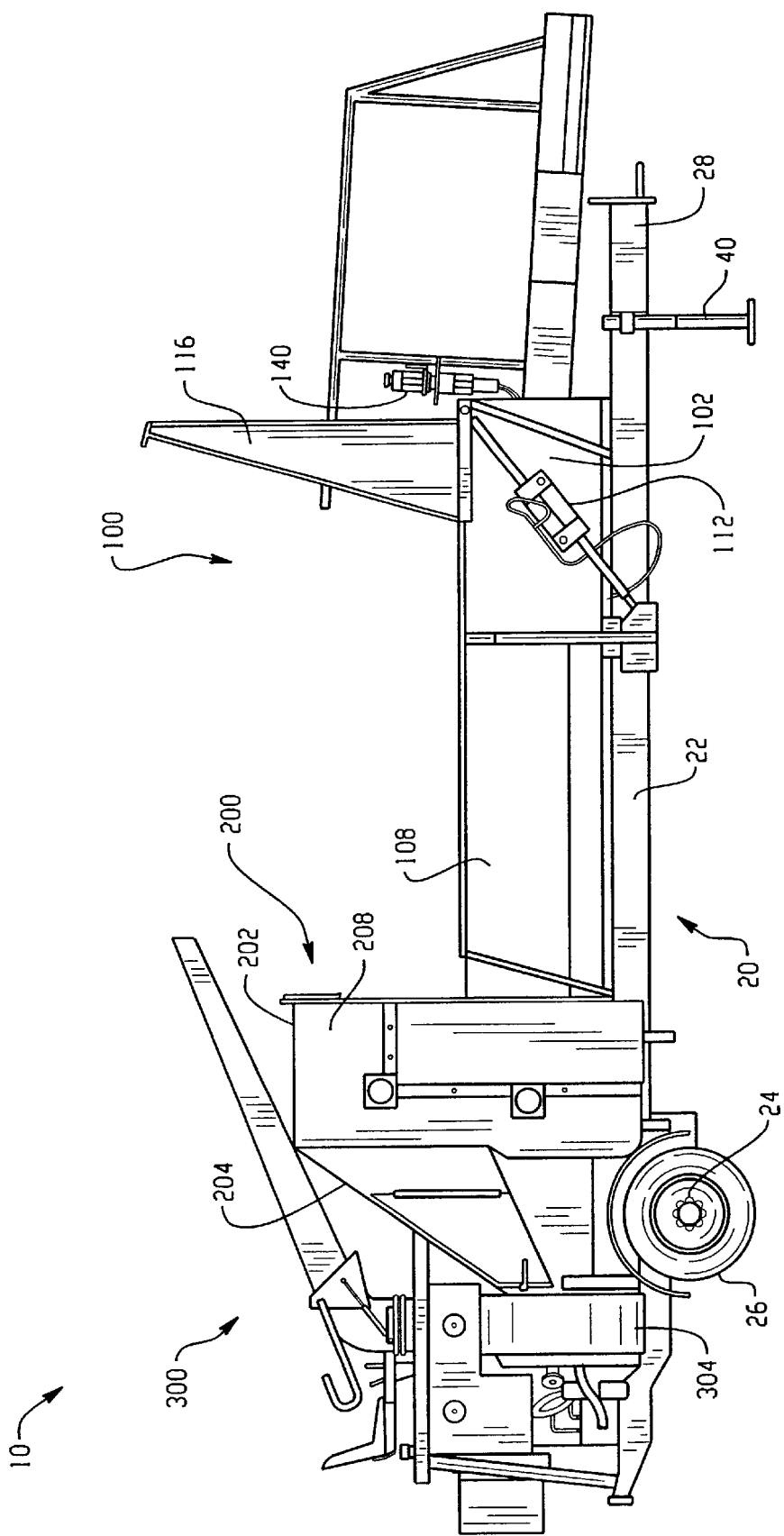
FIG. 2 is a right side elevation view of the variable mulch handling and dispersing apparatus of the present invention.
Figure 14:
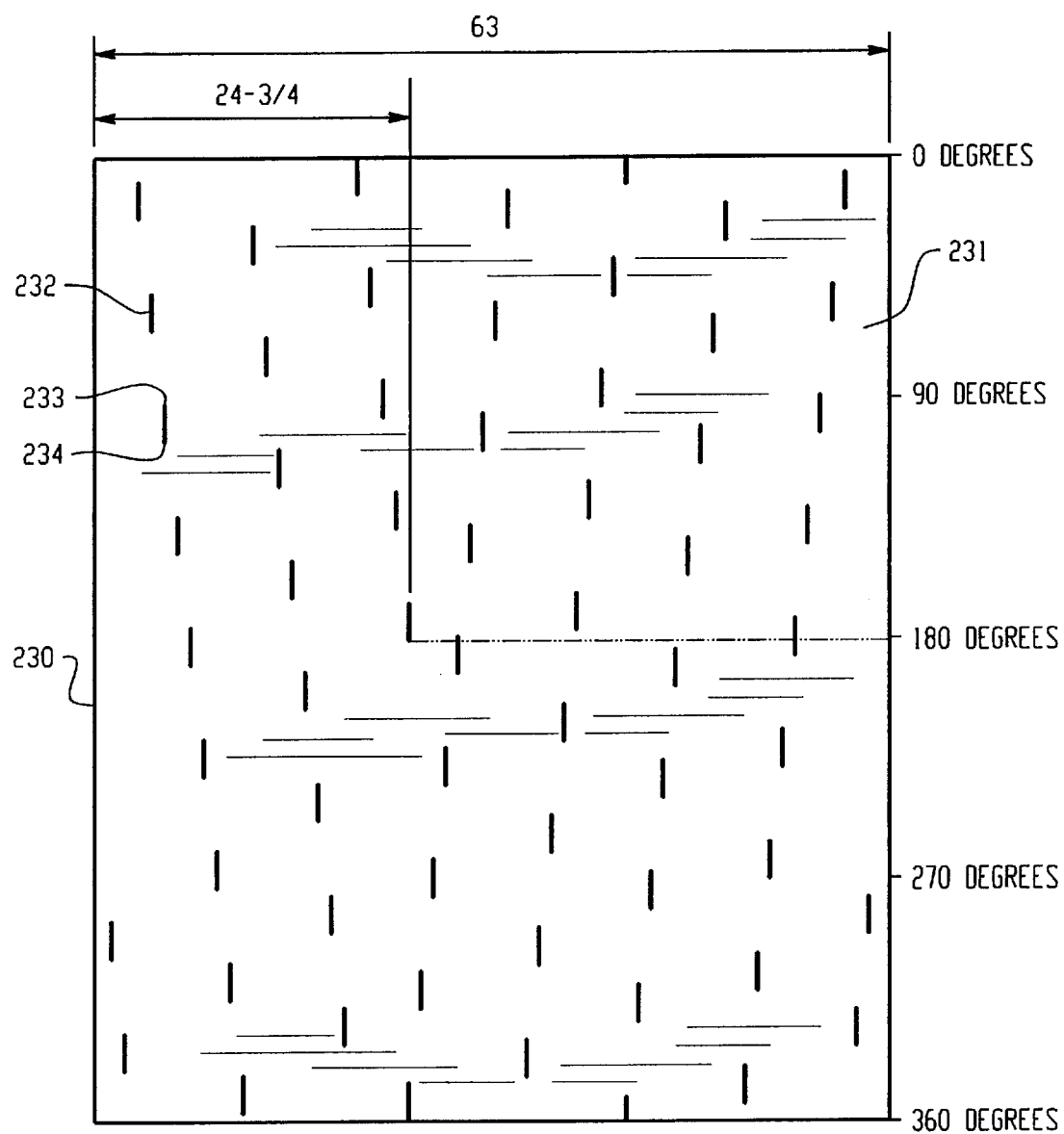
FIG. 14 is a two-dimensional representation of the outer surface of the cylindrical drum second shaft according to an embodiment of the present invention, showing multiple teeth.

In the preferred embodiment, the second shaft 230 rotates counterclockwise when view ed from the right side, as in FIG. 2. As a result, the leading edge 233 of teeth 232 is higher (that is, extends farther radially) than the trailing edge 234. Speeds of revolution vary greatly from approximately 250 rpm to approximately 350 rpm, depending on the design of shaft 230. In the preferred embodiment, the revolution speed of second shaft 230 is about 350 rpm. Again, the goal is to obtain sufficient speeds such that the straw can be thrown into the entrance to blower section 300. In the preferred embodiment, the "bite profile" of teeth 233 of second shaft 230 indicates points of contact approximately one inch apart (see FIGS. 14 and 15*a*). This means that if one were to make an impression on a board of teeth 233 as they revolve around the axis of second shaft 230, the board would indicate that teeth 233 would impact the board approximately every inch along the length of the board. This means that teeth 233 are impacting the bale approximately every inch along the bale's front face.

To prevent twine from wrapping around the rotating second shaft 230, a collar 235 is placed at terminal ends of the second shaft 230. The collar 235 allows the second shaft 230 to freely rotate within the collar 235, while preventing twine and other debris from getting wrapped around the shaft.

Figure 9:
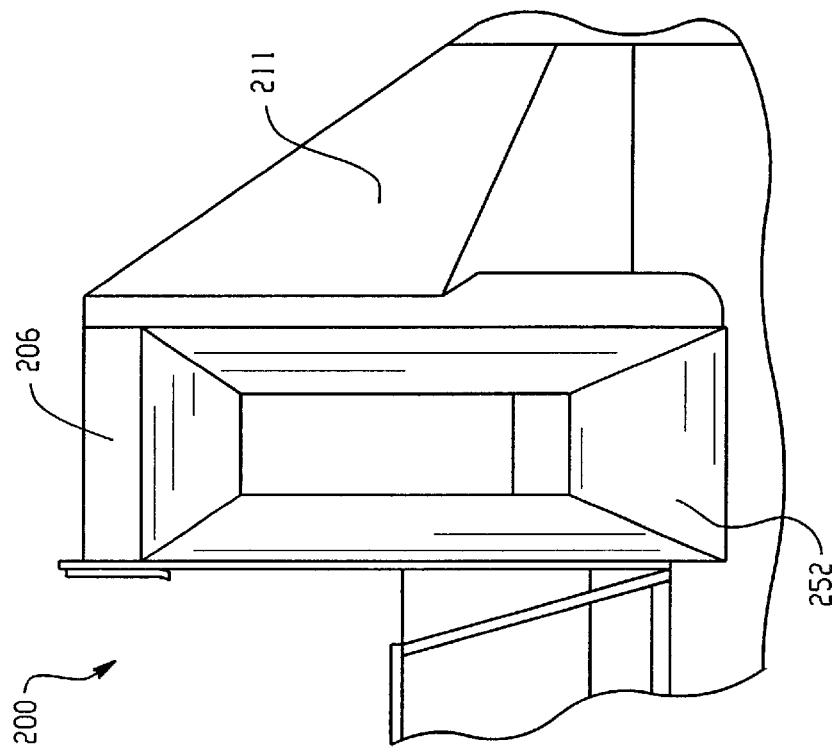
FIG. 9 is a partial left side elevation view of the beater section of the variable mulch handling and dispersing apparatus of the present invention.

Referring now to FIGS. 3 and 9, one of the shafts of the variable mulch handling and dispersing apparatus 10 is driven via drive motor 34 being fed from the main drive engine 30. In the preferred embodiment it is the second shaft 230 that is so driven. Motor 34 for the second shaft 230 can optionally comprise a shear bolt coupling assembly 250 (not shown) for attaching the second shaft 230 to drive motor 34. The shear bolt coupling assembly 250 can be bolted to a gear box that allows for the counter-rotations of the first shaft 220 and second shaft 230. The shear bolt coupling assembly 250 is modified to be adapted to the first shaft 220 whereby, upon entry of a large foreign object, or by some other means providing a large torque to the shaft-motor system, shear bolts in the coupler are broken (as in the normal fashion, sheared), thereby allowing the first shaft 220 and second shaft 230 to cease rotating while the shaft of motor 34 continues to rotate. In other words, the shear bolt assembly effectively disengages the first shaft 220 and second shaft 230 from the motor 34.

In the preferred embodiment, the first shaft 220 is located approximately 32 inches above the second shaft 230 measured from the axial centers of each shaft. In addition, the first shaft 220 of the preferred embodiment is positioned slightly forward, that is, approximately 2 inches closer to the entrance 212, of the second shaft 230. This arrangement, as described, provides the optimum separating action and the optimum movement of the straw into the blower. In the preferred embodiment, the first shaft 220 and second shaft 230 are each approximately 64 inches in length, and second shaft has a diameter of approximately 31 inches.

This combination of counter-rotating beater shafts and paddles provides a good combination of tearing, lifting action and tearing, downward action to keep the straw under control while being torn apart.

Additionally, cover 252 encloses the entire gear box, chain, sprocket, and shear bolt coupler assembly 250 for added safety to the operators, as well as for added protection for these components. Cover 252 is typically fixed to beater section 200 in such a fashion so as to allow cover 252 to pivot or otherwise provide access to its contents. In the preferred embodiment, cover 252 is pivotally mounted at its upper edge to left side 206 of beater section 200, and has at least one pneumatic or hydraulic piston. connected thereto to facilitate raising and lowering of cover 252.

Figure 16:
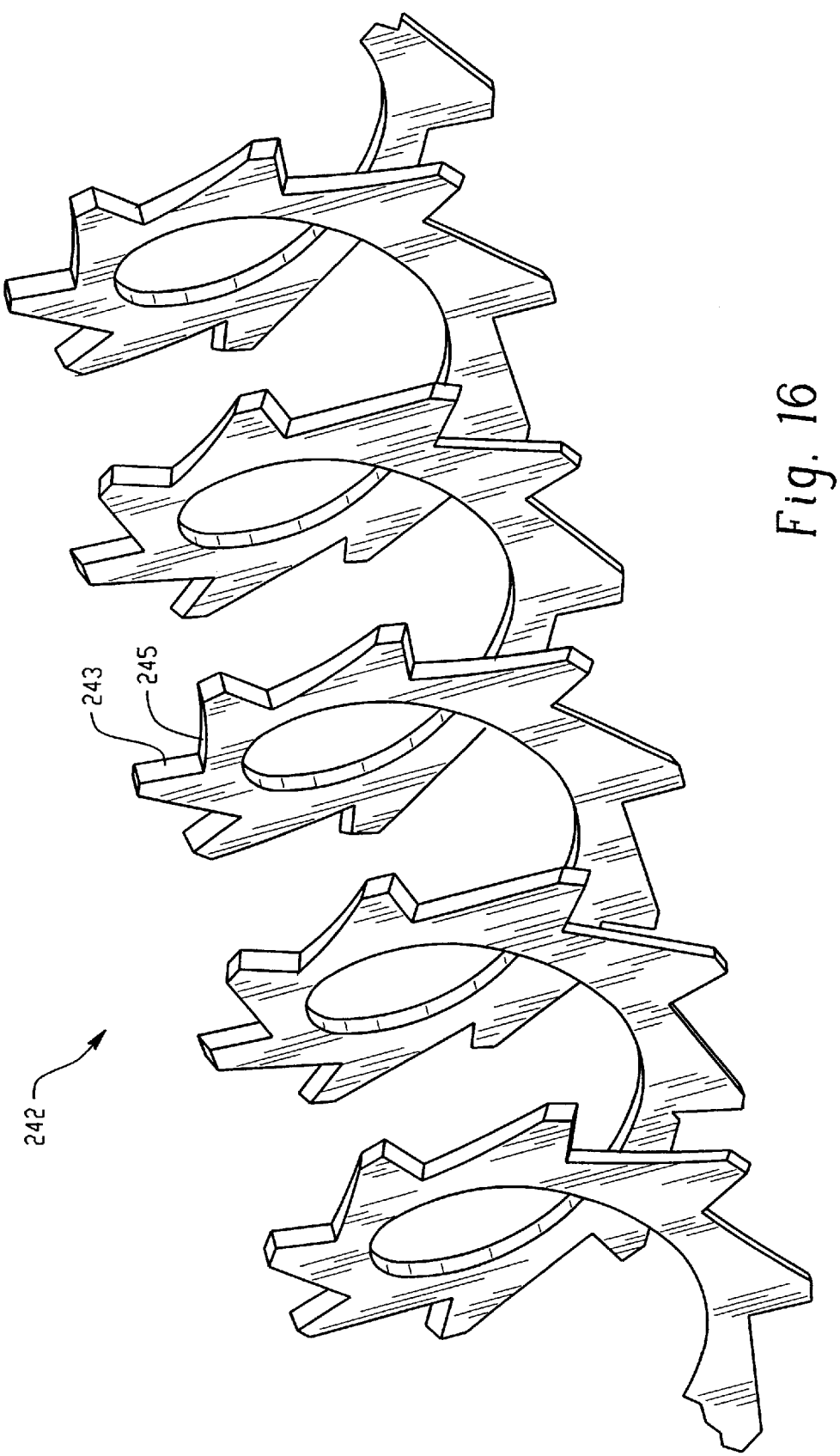
FIG. 16 is a perspective line drawing of a portion of the teeth on the third shaft, according to an embodiment.
Figure 17:
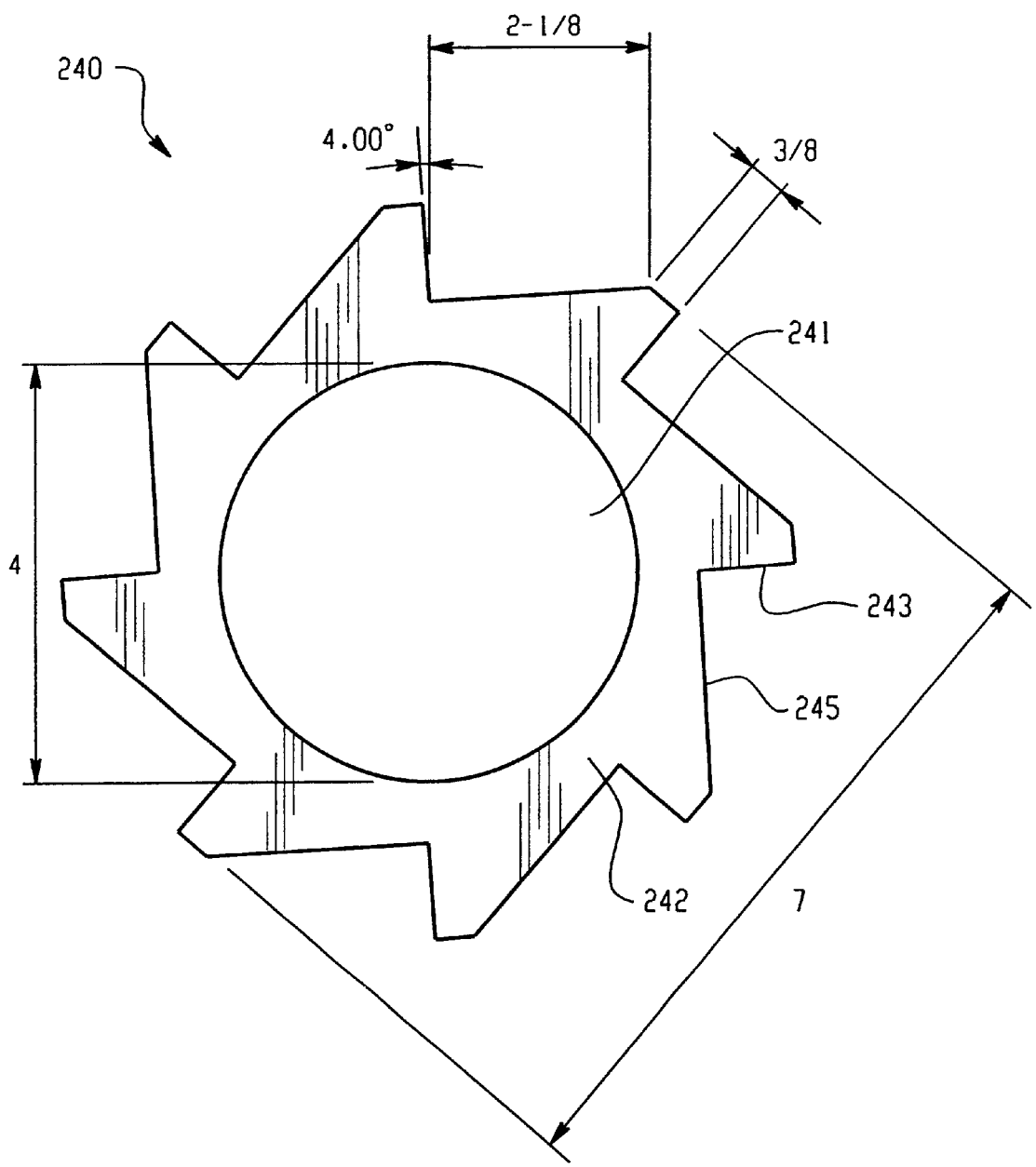
FIG. 17 is a side elevation view of the third shaft according to one embodiment.

Referring still to FIGS. 7 and 8 and also to FIG. 16, the variable mulch handling and dispersing apparatus 10 of the preferred embodiment further comprises a third shaft 240. Third shaft 240 is disposed within front portion 202 of beater section 200 closer to entrance 212 than both first shaft 220 and second shaft 230. Third shaft 240 comprises a small cylindrical core 241. A series of spiral teeth 242 are connected to cylindrical core 241. Spiral teeth 242 have a substantially vertical portion 243 and a substantially angled portion 245, and have a negative "rake", meaning that the angle between substantially vertical portion 243 and substantially angled portion 245 is greater than 90 degrees (see FIG. 17). This minimizes the aggregation of straw on the teeth, such as when the straw gets trapped on the teeth. A positive rake, one where the internal angle between teeth is less than 90 degrees, has a greater tendency to trap straw as the teeth rotate. Although either direction of rotation is possible, the preferred embodiment has third shaft 240 rotating in the same direction as that of second shaft 230, namely counterclockwise when viewed from the right side, as in FIG. 2. In the preferred embodiment, the "bite profile" of teeth 242 of third shaft 240 is approximately every three-eighths of an inch. This means that if one were to make an impression on a board of teeth 242 as they revolve around the axis of third shaft 240, the board would indicate that teeth 242 would impact the board approximately every three-eighths of an inch. In other words, teeth 242 impact the bale about every three-eighths of an inch across the bale's front face.

As was the case with the first shaft 220 and second shaft 230, the teeth 242 on third shaft 240 are oriented in a generalized spiral about the cylindrical core 241, extending from both ends of the third shaft 240 toward the center. In addition, the location where the spiral directions change is designed to coincide with the location of the input to blower section 300. In the preferred embodiment, this location on the third shaft 240 is disjointed. In other words, the teeth 242 leading from the left end of the third shaft 240 do not meet with the teeth 242 leading from the right end. Rather, the teeth 242 leading from the right end stop at a location on the circumference of the cylindrical core 241 about between 45 degrees and 135 degrees "out of phase." The goal for this arrangement is to prevent locations on the third shaft 240 which have areas that are likely to trap straw.

Figure 19A:
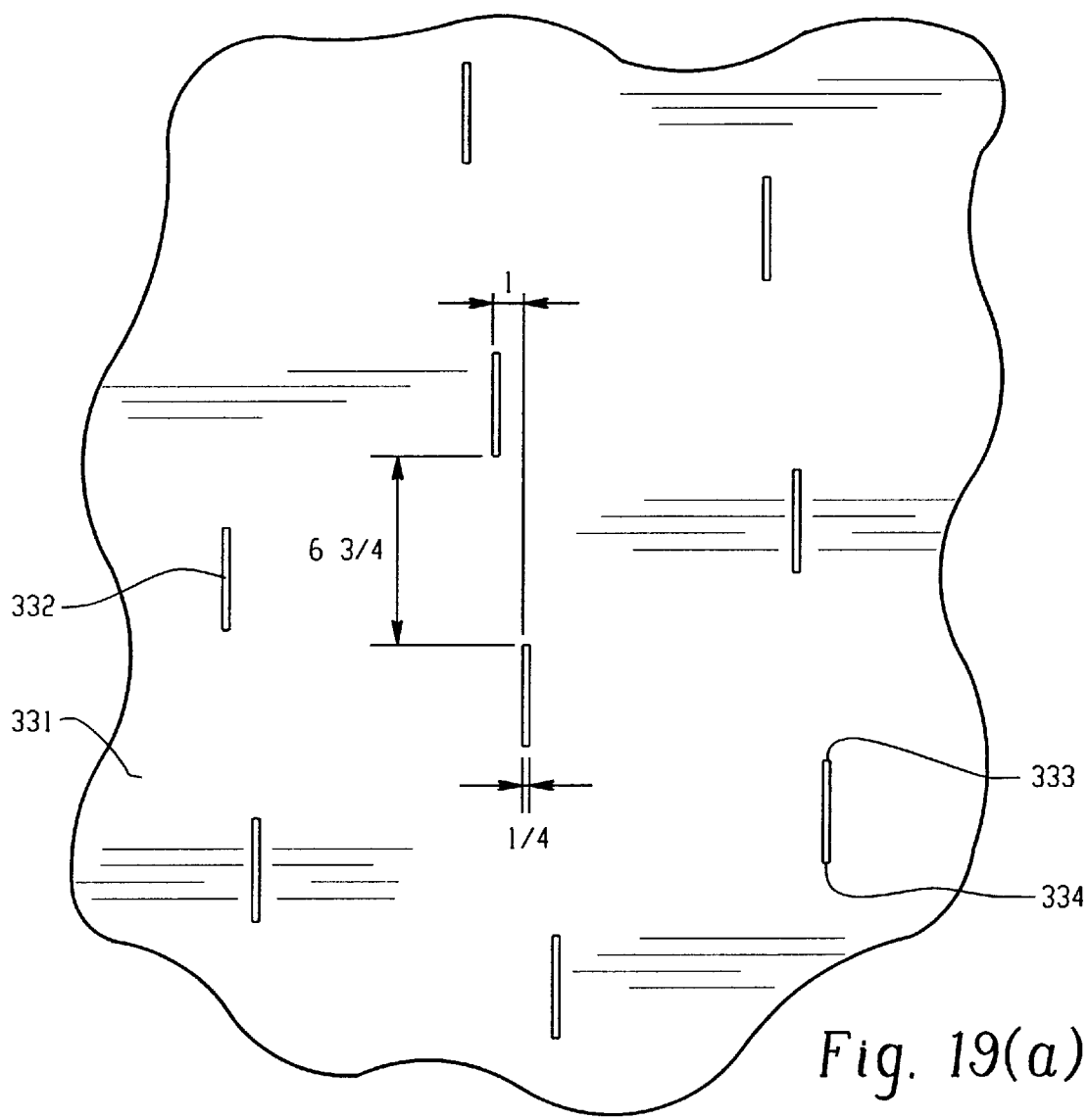
FIG. 19a is a close-up depiction of several teeth of the fourth shaft according to an embodiment, indicating a typical bite profile.
Figure 19B:
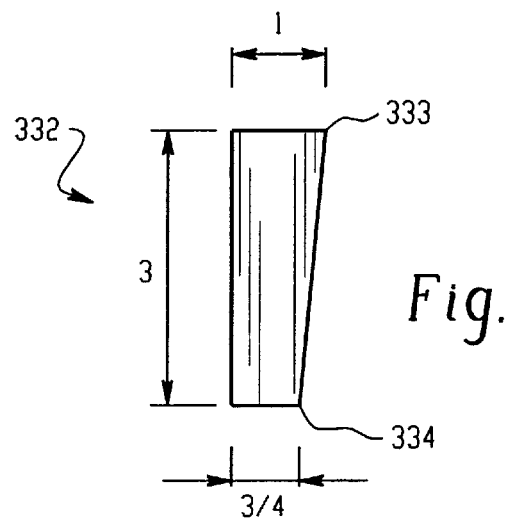
FIG. 19b is a side elevation view of a tooth for a fourth shaft, according to one embodiment.

The third shaft 240 is called a metering shaft because it operates to meter the flow of straw from the bale into the beater section 200. In particular, large bales entering beater section 200 without a third shaft 240 are likely to clog the apparatus because the counter-rotating first and second shafts 220, 230 create a pinch point. Large bales, especially if wet or extremely dense, will tend to be fed into the pinch point too rapidly, thus causing clogging or plugging. The addition of the third shaft 240 all but eliminates this problem because third shaft 240 operates to separate or divide the bale into portions as the bale enters beater section 200. Because the third shaft 240 is vertically located between first shaft 220 and second shaft 230, third shaft 240 eliminates the pinch point. Furthermore, because third shaft 240 is located horizontally forwardly of both first shaft 220 and second shaft 230, third shaft 240 serves to divide the bale into two halves, thus reducing the size of material that the first and second shafts 220, 230 must separate. This results in dramatic increases in speed and efficiency, and dramatic reductions in plugging. FIGS. 18, 19a, and 19b depict a typical bite profile and teeth for a fourth shaft. In the embodiment shown therein, fourth shaft 330 is similar to the second shaft 230 wherein the fourth shaft 330 further comprises a drum 331, teeth 332 disposed thereon, and wherein the teeth 332 have a leading edge 333 and a trailing edge 334.

Additionally, third shaft 240 is preferably driven by the same motor 34 that drives the primary conveyor 103. This allows third shaft 240 to rotate at speeds that are appropriate for the given translational speed of the primary conveyor 103. This results in a metering function for the third shaft 240. Speeds of revolution of third shaft 240 vary in a range from approximately 10–100 rpm. The speed of the preferred embodiment is about 50–60 rpm.

Rear portion 204 of beater section 200 further comprises funneling surfaces, here depicted as 211, 213, and 215. Funneling surfaces 211, 213, 215 serve to direct the straw from exit 214 of front portion 202 to an entrance 302 of blower section 300. Funneling surfaces 211, 213, 215 can be of varying shapes and sizes, and can be substantially planar or curved. Additionally, funneling surfaces 211, 213, 215 can comprise any number of sides, from a single curved surface to an array with many sides.

Rear portion 204 further comprises a floor 217 that further directs straw into entrance 302 of blower section 300. Floor 217 can likewise be of varying shapes, including, but not limited to substantially planar, curved, cylindrical, polygonal, or any irregular shape. In the preferred embodiment, floor 217 further comprises a substantially semi-cylindrical portion 219 following the general contour of the circumference of second shaft 230. When configured in this manner, semi-cylindrical portion 219 acts as a back-up panel for straw that could not exit front portion 202 of blower section 200.

Rear portion 204 further comprises access panel 201 which provides access to rear portion 204. Access panel 201 is typically hingedly attached to one of funneling surfaces 211, 213, 215 via hinge 203. Handle 205 provides a lockable and releasable connection of access panel 201 to one of funneling surfaces 211, 213, 215. Access panel 201 is useful for maintenance, service, and cleaning activities.

Referring now to FIGS. 1, 2, 3, 4, and 6, the variable mulch handling and dispersing apparatus 10 further comprises a blower section 300. Blower section 300 comprises, typically, an entrance portion 302, a blower fan 304, a blower fan shaft 306, and a blower exit 308. Blower fan shaft 306 is direct driven from the main drive engine 30 via a drive belt 310. Blower section 300 is typically situated on the mobile frame 20 just to the rear of, and adjoining the rear portion 204 of the beater section 200. The straw that is separated from the bale by the first, second, and third shafts 220, 230, 240, travels to the rear portion 204 of the beater section 200 which contains funneling surfaces 211, 213, 215. Funneling surfaces 211, 213, 215 direct the straw to entrance portion 302 of the blower section 300. From there the straw is taken into blower fan 304 which mixes the straw with air at high velocity to discharge the mixture out of blower exit 308 and through turret assembly 309.

For ease of operation and to allow maximum control for application of the material to the ground, turret assembly 309 is typically movable and rotatable, and can comprise a steering means 314 and a seat 316 for more accurately directing the straw onto the ground. Blower section 300 can also include a ladder 301, a platform 303, and guardrails 305. In addition, blower fan 304 itself could be movably or rotatably mounted so as to enable more accurate placement of the straw on the ground. The blower fan 304 and turret assembly 309 can be of standard design. The blower and turret assembly of the preferred embodiment is similar to a Finn B-260. The operator can sit in seat 316 and steer turret assembly 309 a full 360 degrees for maximum controlled application. Additionally, turret assembly 309 has a range of vertical movement as well for added control. In addition, located at or near the seat 316 on the platform 303 are one or more control panels 312, levers, knobs, or the like for controlling all functions of the variable mulch handling and dispersing apparatus 10. From seat 316, the operator can control the power and throttle for blower fan 304, thus controlling the rate of application. Further, the operator can control the rotational speed of the first, second, and third shafts 220, 230, 240, as well as the speed of primary conveyor 103. In addition, the operator can control any other accessories or safety equipment that can be optionally installed on the variable mulch handling and dispersing apparatus 10. Particularly, turret assembly 309 can be fitted with some form of electronic signaling device, forming part of an electrical signaling system, that can be used by the operator of turret assembly 309. This signaling system can be connected electrically to the electrical system of the tow vehicle 50. It can allow the operator to relay information to the driver of the tow vehicle 50 that can signify such things as whether and how to regulate the speed and/or direction of the tow vehicle 50. In addition, said signaling system can include certain safety systems and features to allow the operator and driver to relay emergency or safety information to one another.

It should be noted that some of the straw leaving the rear portion 204 of the beater section 200 may to a floor 303 of the entrance portion 302 of the blower section 300, or the floor 217 of rear portion 204 of beater section 200, depending on the embodiment. Floor 303 or floor 217 are designed to ensure the straw eventually feeds into blower fan 304. Some of the straw additionally impacts funneling surfaces 211, 213, 215 at the rear portion 204 of the beater section 200, thereby traveling to the entrance portion 302. According to the principles of standard blower technology, the straw that enters the blower fan 304 exits the blower section 300 through blower chute 308.

Additionally, however, blower section 300 can itself contain a concave floor 320 disposed beneath blower fan shaft 306. Floor 320 is shaped to accept thrashing chains 322 or other means of secondary reduction of the straw. Such thrashing chains 322 are typically attached to the blower fan shaft 306 so that the centripetal force of the rapidly rotating blower fan shaft 306 causes the thrashing chains 322, or other radial appurtenances, to chop or otherwise cut or shred the straw material. Such additions are not preferred, however, due to the desire to keep the straw material as large and intact as possible while still going through the blower section 300. Further chopping or shredding of the material tends to reduce it to so small a size as to be similar to dust, and therefore not the type of ground cover desired.

Figure 13:
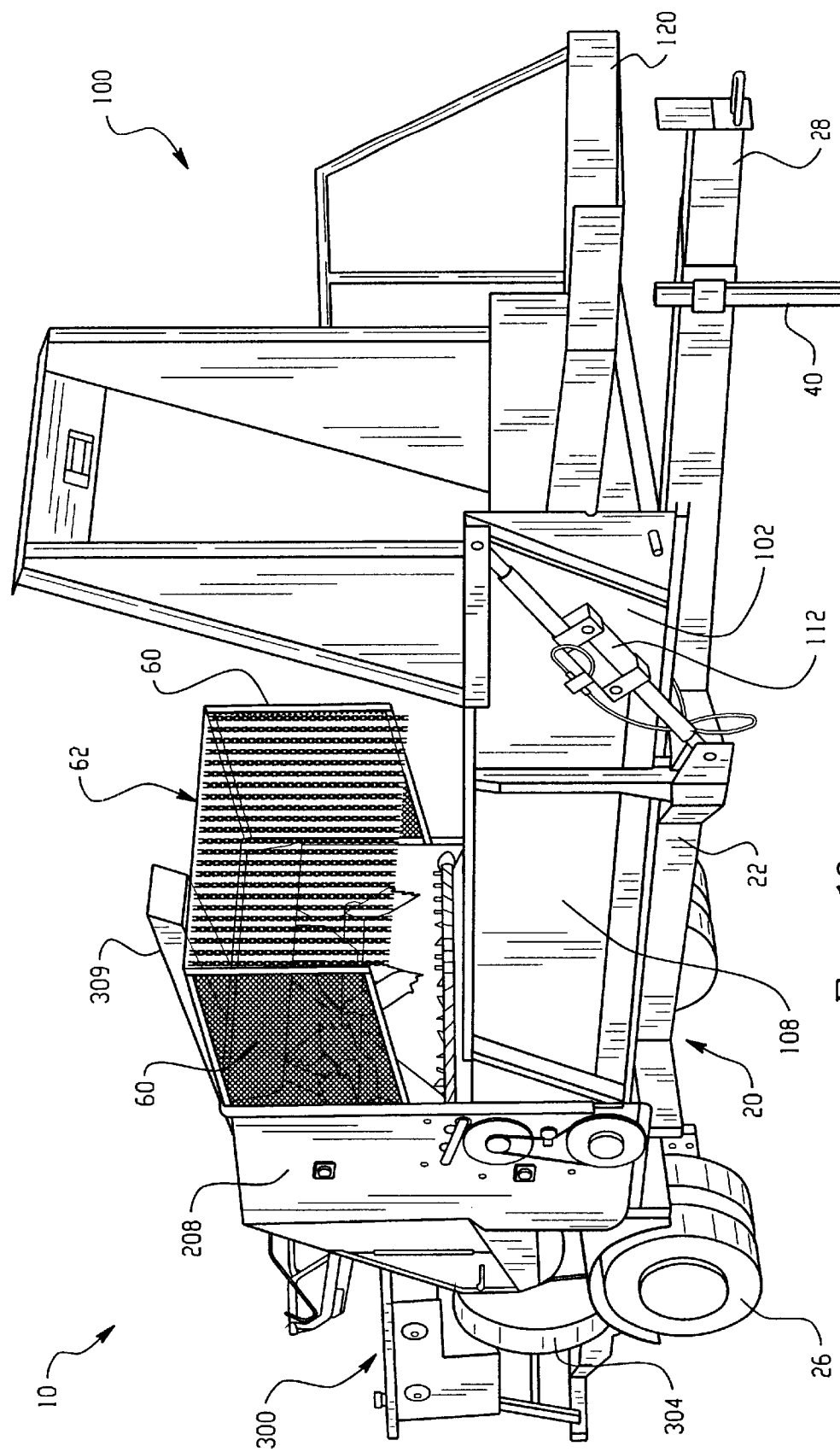
FIG. 13 is a front right perspective of the variable mulch handling and dispersing apparatus according to an alternative embodiment.

Referring now to FIG. 13, there is shown an alternative embodiment depicting some of the various types of safety accessories and features that also come within the scope of this invention. Beater section 200 can further comprise safety panels 60. Safety panels 60 can be situated around the perimeter of entrance 212 of beater section 200. In this regard it is noted that sides 206, 208 of beater section 200 can be constructed so as to provide this added level of safety. Additionally, a chain curtain 62 and many other similar devices can be located at entrance 212. Both safety panels 60 and chain curtain 62 serve to deflect debris that may exit beater section 200.

While there has been described and illustrated particular embodiments of a variable mulch handling and dispersing apparatus for effectively reducing bales to individual straw particles and dispersing those particles evenly and uniformly over a large area, it will be apparent to those skilled in the art that variations and modifications are possible without deviating from the broad spirit and principle of the present invention, which shall be limited solely by the scope of the claims appended hereto.

We claim:

1. A variable mulch handling and dispersing apparatus for receiving bales comprising:

a mobile longitudinal frame connectable with a tow vehicle and having a main drive engine coupled thereto, said main drive engine having a hydraulic pump coupled therewith;

an input section mounted substantially longitudinally on said mobile longitudinal frame and having an entrance and an exit, said input section further comprising a primary conveyor assembly driven by said main drive engine for conveying said bales from said entrance to said exit;

a beater section mounted substantially longitudinally on said mobile longitudinal frame and having an entrance and an exit, said entrance of said beater section adjacent said exit of said input section, said beater section further comprising at least three rotatable shafts driven by said main drive engine disposed in spaced-apart parallel relationship, wherein a first shaft and a second shaft are rotatable in opposite directions, and wherein a third shaft is disposed closer to said entrance of said beater section than both said first shaft and said second shaft, said beater section further comprising a plurality of funneling surfaces that direct material toward said exit of said beater section, wherein said at least three rotatable shafts pick apart said bales, reducing said bales into constituent materials as said bales are continuously conveyed into said beater section from said input section via said primary conveyor assembly; and a blower section having an entrance and an exit, said entrance of said blower section adjacent said exit of said beater section, said blower section further comprising a blower fan generating a high velocity of air and mixing said constituent materials with said air and forcing said mixture through said exit of said blower section.

2. The variable mulch handling and dispersing apparatus according to claim 1 wherein said primary conveyor assembly further comprises a substantially rectangular floor having a first end and a second end and a first edge and a second edge and a drag chain conveyor coupled to said main drive engine wherein a first drag chain is disposed at said first edge and a second drag chain is disposed at said second edge and wherein said first and second drag chains are separated by and coupled to a plurality of transverse linkages.

3. The variable mulch handling and dispersing apparatus according to claim 2 wherein said substantially rectangular floor provides a barrier substantially preventing material from passing vertically through said primary conveyor assembly to ground.

4. The variable mulch handling and dispersing apparatus according to claim 1 wherein said primary conveyor assembly is adjustably mounted to said mobile frame and coupled with said hydraulic pump so that said entrance of said input section is movable relative to said mobile longitudinal frame.

5. The variable mulch handling and dispersing apparatus according to claim 1 wherein said input section further comprises a secondary feed table.

6. The variable mulch handling and dispersing apparatus according to claim 5 wherein said secondary feed table is movably connected to said primary conveyor assembly.

7. The variable mulch handling and dispersing apparatus according to claim 5 wherein said secondary feed table further comprises a secondary conveyor.

8. The variable mulch handling and dispersing apparatus according to claim 7 wherein said secondary conveyor further comprises an overrunning clutch conveyor.

9. The variable mulch handling and dispersing apparatus according to claim 5 wherein said input section further comprises a tertiary feed table connected to said secondary feed table.

10. The variable mulch handling and dispersing apparatus according to claim 1 wherein said variable mulch handling and dispersing apparatus has an overall width allowing said apparatus to travel on roadways without requiring an oversize hauling permit.

11. The variable mulch handling and dispersing apparatus according to claim 1 wherein said input section further comprises a winch for assisting in loading said bales onto said input section.

12. The variable mulch handling and dispersing apparatus according to claim 1 wherein said first shaft further comprises an inner cylindrical core having an outer surface and a length, and a plurality of paddles having proximal ends and distal ends, said proximal ends of said plurality of paddles coupled to and disposed along said outer surface of said inner cylindrical core.

13. The variable mulch handling and dispersing apparatus according to claim 12 wherein said plurality of paddles are disposed substantially spirally around said outer surface of said inner cylindrical core.

14. The variable mulch handling and dispersing apparatus of claim 13 wherein said plurality of teeth have a bite profile creating contact points approximately substantially continuous along said length thereof.

15. The variable mulch handling and dispersing apparatus according to claim 13 wherein said substantially spiral disposition of said plurality of paddles directs material toward said entrance of said blower section.

16. The variable mulch handling and dispersing apparatus according to claim 12 wherein said plurality of paddles are disposed along said outer surface of said inner cylindrical core at an angle of approximately 23 degrees from a centroidal axis of said inner cylindrical core.

17. The variable mulch handling and dispersing apparatus according to claim 12 wherein said distal ends of said plurality of paddles further comprise a plurality of teeth having a vertical front face, a diagonal back face, and a flat outer face.

18. The variable mulch handling and dispersing apparatus according to claim 1 wherein said second shaft further comprises an inner drum having an outer surface and a length and a plurality of teeth coupled to and disposed along said outer surface of said inner drum along said length thereof.

19. The variable mulch handling and dispersing apparatus according to claim 18 wherein said plurality of teeth are disposed substantially spirally around said outer surface of said inner drum.

20. The variable mulch handling and dispersing apparatus of claim 19 wherein said plurality of teeth have a bite profile creating contact points approximately one inch apart along said length thereof.

21. The variable mulch handling and dispersing apparatus according to claim 19 wherein said substantially spiral disposition of said teeth directs material toward said entrance of said blower section.

22. The variable mulch handling and dispersing apparatus according to claim 18 wherein said plurality of teeth are polygonal in shape.

23. The variable mulch handling and dispersing apparatus according to claim 18 wherein said plurality of teeth are trapezoidal.

24. The variable mulch handling and dispersing apparatus according to claim 1 wherein said third shaft further comprises an inner cylindrical core having an outer surface and a length and a plurality of teeth disposed substantially spirally along said outer surface of said inner cylindrical core along said length thereof.

25. The variable mulch handling and dispersing apparatus of claim 24 wherein said plurality of teeth have a bite profile creating contact points approximately three-eighths of an inch apart along said length thereof.

26. The variable mulch handling and dispersing apparatus according to claim 24, wherein said plurality of teeth further comprise a substantially vertical face and a substantially angled face having an angle therebetween.

27. The variable mulch handling and dispersing apparatus according to claim 26 wherein said angle lies in the range of approximately 1 degree to approximately 179 degrees.

28. The variable mulch handling and dispersing apparatus according to claim 1 wherein said variable mulch handling and dispersing apparatus further comprises a twine removal device.

29. The variable mulch handling and dispersing apparatus of claim 1 wherein said first shaft is disposed closer to said entrance of said beater section than is said second shaft.

30. The variable mulch handling and dispersing apparatus of claim 1 wherein said beater section further comprises a fourth rotating shaft disposed closer to said entrance of said beater section than are all of said first shaft, said second shaft, and said third shaft.

31. The variable mulch handling and dispersing apparatus of claim 30 wherein said fourth shaft further comprises an inner drum having an outer surface and a length and a plurality of teeth coupled to and disposed along said outer surface of said inner drum along said length thereof.

32. The variable mulch handling and dispersing apparatus according to claim 31 wherein said plurality of teeth are disposed substantially spirally around said outer surface of said inner drum.

33. The variable mulch handling and dispersing apparatus according to claim 32 wherein said substantially spiral disposition of said teeth directs material toward said entrance of said blower section.

34. The variable mulch handling and dispersing apparatus according to claim 30 wherein said plurality of teeth are polygonal in shape.

35. The variable mulch handling and dispersing apparatus according to claim 30 wherein said plurality of teeth are trapezoidal.

36. The variable mulch handling and dispersing apparatus according to claim 34 wherein said plurality of teeth have a bite profile creating contact points approximately one inch apart along said length thereof.

37. A mobile variable mulch handling and dispersing apparatus comprising a mobile longitudinal frame having a first end and a second end and further comprising a main drive engine coupled thereto and a hydraulic pump coupled to said main drive engine, an input section mounted at said first end for receiving bales, a beater section mounted adjacent said input section, and a blower section mounted adjacent said beater section at said second end; said input section further comprising a primary conveyor assembly driven by said main drive engine for continuously conveying said bales from said input section toward said beater section; said beater section further comprising at least three rotatable shafts disposed horizontally in spaced-apart relationship wherein a first shaft is disposed above a second shaft and slightly closer to said first end than is said second shaft and wherein said first shaft and said second shaft are rotatable in opposite directions creating a pinch point and wherein a third shaft is horizontally disposed closer to said first end than both said first shaft and said second shaft such that said bales contact said third shaft before contacting said first shaft and said second shaft as said bales are continuously conveyed into said beater section from said input section, said bales being divided into constituent materials as said bales pass through said beater section; and said blower section comprising an entrance and an exit, said blower section further comprising a fan disposed near said entrance of said blower section generating high velocity of air within said blower section to facilitate dispersal of said constituent materials through said exit of said blower section.

38. A mobile variable mulch handling and dispersing apparatus for continuously receiving bales of nearly any size and shape and capable of being towed on highways without an oversize permit comprising:

a mobile longitudinal frame having a first end and a second end, said first end connectable with a tow vehicle, said second end being fitted with a main drive engine, said main drive engine further coupled to at least one hydraulic pump for operating hydraulic equipment;

an input section having an entrance toward said first end, and an exit, said input section further comprising a primary conveyor assembly driven by said main drive engine for conveying said bales at a feed rate from said entrance of said input section to said exit of said input section;

a beater section having an entrance adjacent said exit of said input section, and an exit, said entrance of said beater section receiving said bales from said exit of said input section, said beater section further comprising at least two rotatable beater shafts driven by said main drive engine disposed in spaced-apart parallel relationship, said at least two rotatable beater shafts further comprising a first shaft having a first diameter and a first centroidal axis therealong and a second shaft having a second diameter and a second centroidal axis therealong, said first shaft further comprising an inner cylindrical core and a plurality of paddles disposed substantially spirally about said inner cylindrical core, and said second shaft further comprising an inner drum and a plurality of teeth disposed substantially spirally about said inner drum; and said beater section further comprising at least one rotatable metering shaft having a third diameter and a third centroidal axis therealong, wherein said third diameter is substantially less than said second diameter, said at least one metering shaft disposed closer to said entrance of said beater section and in spaced-apart parallel relationship to said first shaft and said second shaft, said first shaft and said second shaft rotatable in opposite directions about said first longitudinal axis and said second longitudinal axis, and wherein said bales enter said beater section from said input section and are divided into constituent materials by said at least two rotatable beater shafts and said at least one metering shaft; and a blower section adjacent said second end, said blower section further comprising a blower entrance adjacent said exit of said beater section, a blower fan, and a blower exit, said blower entrance receiving said constituent materials from said exit of said beater section and mixing said constituent materials with air from said blower fan to convey said mixture through said blower exit.

\* \* \* \* \*